US007416814B2

(12) United States Patent
Kaneda et al.

(10) Patent No.: US 7,416,814 B2
(45) Date of Patent: Aug. 26, 2008

(54) LITHIUM SECONDARY BATTERY, AND PROCESS FOR PRODUCING THE SAME

(75) Inventors: Junya Kaneda, Hitachi (JP); Noriyuki Watanabe, Hitachinaka (JP); Yasuhisa Aono, Hitachi (JP); Seiji Takeuchi, Hitachiota (JP); Yasushi Muranaka, Hitachinaka (JP); Kouichi Takei, Hitachi (JP)

(73) Assignees: Hitachi, Ltd., Tokyo (JP); Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/331,648

(22) Filed: Dec. 31, 2002

(65) Prior Publication Data

US 2003/0091901 A1 May 15, 2003

Related U.S. Application Data

(62) Division of application No. 09/482,644, filed on Jan. 13, 2000, now Pat. No. 6,524,749.

(30) Foreign Application Priority Data

Jan. 14, 1999 (JP) ................................ 11-007380

(51) Int. Cl.
*H01M 4/58* (2006.01)

(52) U.S. Cl. ............................. 429/231.4; 429/231.95; 429/231.6; 429/231.8

(58) Field of Classification Search ................. 429/302, 429/322, 344, 213, 231.4, 231.7, 231.8, 231.9, 429/231.95

See application file for complete search history.

(56) References Cited

U.S. PATENT DOCUMENTS 5,888,430 A 3/1999 Wakayama et al.
6,090,505 A 7/2000 Shimamura et al.

(Continued)

FOREIGN PATENT DOCUMENTS

EP 0 685 896 12/1995

(Continued)

OTHER PUBLICATIONS

European Search Report dated Nov. 5, 2003, for EP No. 00 10 0127.

(Continued)

*Primary Examiner*—Patrick Ryan
*Assistant Examiner*—Ben Lewis
(74) *Attorney, Agent, or Firm*—Antonelli, Terry, Stout & Kraus, LLP.

(57) ABSTRACT

A lithium secondary battery, which comprises a positive electrode, a negative electrode containing a lithium ion-storable/dischargeable negative electrode-active material and a lithium ion conductive, non-aqueous electrolytic solution or polymer electrolyte can have distinguished charging/discharging characteristics and a higher safety, when the negative electrode material contains particles comprising carbonaceous materials and at least one of elements capable of forming a compound with Li; the elements have a melting point of at least 900° C. and a thermal expansion coefficient of not more than 9 ppm/K at room temperature; the particles are embedded in a plurality of layers of the carbonaceous materials; the particles being subjected to a mechanical treatment to make particle sizes of the particles smaller than the initial particle size in advance.

17 Claims, 5 Drawing Sheets

22 21 18 23 17 16 14 15 20 13 12 11 23 19

U.S. PATENT DOCUMENTS 6,350,544 B1 * 2/2002 Takami et al. ............ 429/231.4

FOREIGN PATENT DOCUMENTS

| | | |
|---|---|---|
| JP | A 5-286763 | 11/1993 |
| JP | A 6-279112 | 10/1994 |
| JP | 09-249407 | 9/1997 |
| JP | 09-320599 | 12/1997 |
| JP | A 10-3920 | 1/1998 |
| JP | 11-040158 | 2/1999 |
| JP | 2948205 | 9/1999 |
| JP | 2948206 | 9/1999 |
| JP | 11-339778 | 12/1999 |
| JP | 11-339796 | 12/1999 |
| WO | WO 98/53511 | 11/1998 |

OTHER PUBLICATIONS

A. M. Wilson, et al., "Lithium Insertion in Carbons Containing Nanodispersed Silicon", Department of Physics, J. Electrochem. Soc., vol. 142, No. 2, Feb. 1, 1995, pp. 326-332.

* cited by examiner

LITHIUM SECONDARY BATTERY, AND PROCESS FOR PRODUCING THE SAME

This application is a Divisional Application of prior Application Ser. No. 09/482,644, filed Jan. 13, 2000, now U.S. Pat. No. 6,524,749 the contents of which are incorporated herein by reference in their entirety.

BACKGROUND OF THE INVENTION

The present invention relates to a secondary battery using a non-aqueous electrolytic solution, and particularly to a lithium secondary battery having distinguished charging/discharging characteristics such as a higher voltage, a higher energy density, a higher charging/discharging capacity and a longer cycle life as well as a higher safety.

With miniaturization and weight reduction of portable electronic appliances, development of higher energy density batteries, particularly secondary batteries, has been keenly desired. A lithium secondary battery is now regarded as a promising candidate.

Lithium secondary battery has a high voltage and a high energy density and also a light weight, as compared with a nickel-cadmium battery, a lead storage battery and a nickel-hydrogen battery. However, a lithium secondary battery using lithium metal as a negative electrode-active material has problems of short battery life and poor safety because lithium tends to deposit on the negative electrode surface as dendrites, resulting in occurrence of an internal short-circuit to the positive electrode and inactivation toward the electrolytic solution.

To avoid risks of using lithium metal, lithium secondary batteries using lithium alloys such as Li—Pb, Li—Al, etc. as negative electrode-active materials have been developed. However, even these lithium secondary batteries still suffer from problems of dendrite deposition and pulverization, so that no satisfactory battery life has been obtained yet.

On the other hand, a lithium secondary battery using graphite as a negative electrode-active material has been developed and is now in practical use, where the graphite can store/discharge lithium ions by reaction of diffusing lithium ions into between the c planes of graphite or releasing therefrom, while it is more stable than the chemically active metallic lithium and is free from deposition of lithium dendrites, resulting in prolonged cycle life and increased safety.

In case of using graphite as a negative electrode-active material, the discharge capacity is 370 Ah/kg at most. To increase the capacity of the lithium secondary battery, it is indispensable to use negative electrode-active materials of higher capacity. The negative electrode-active materials of higher capacity include Al, Pb, etc., i.e. elements capable of forming intermetallic compounds with Li, but suffer from a rapid cycle deterioration when used alone or in combination with electroconductive particles as a negative electrode-active material, and thus have not been practically used as a negative electrode-active material.

There are many proposals for using negative electrode-active material comprising particles including an element capable of forming a compound with lithium and a carbonaceous material in a lithium secondary battery (JP-A 5-286763, JP-A 6-279112, JP-A 10-3920). However, since elements having low melting points such as Sn (m.p. 232° C.), Pb (m.p. 327° C.), Zn (m.p. 419° C.), Al (m.p. 660° C.), etc. are usable as the element capable of forming a compound with lithium, there is a fear of unexpectedly lowering properties of the products due to aggregation and agglomeration due to melting when carbonization treatment is conducted at 800° C. or higher. Further, since elements having higher thermal expansion coefficients such as Sn (22.0 ppm/K at 25° C.), Al (23.1 ppm/K at 25° C.), Mg (24.8 ppm/K at 25° C.), Pb (28.9 ppm/K at 25° C.), etc. are usable as the element capable of forming a compound with lithium, there is a fear of failing to maintain adhesiveness to carbon during carbonization treatment and cooling, resulting in incapable of maintaining the particle shape.

Further, Japanese Patent Nos. 2948205 and 2948206 disclose negative electrode materials containing 30 to 90% by weight of silicon. But since silicon is simply mixed with a carbonaceous material and sintered at 600 to 1400° C. under non-oxidative atmosphere, uniformity of the quality of the negative electrode materials and improvement of the quality thereof cannot be expected.

BRIEF SUMMARY OF THE INVENTION

An object of the present invention is to provide a lithium secondary battery with a higher capacity and a longer cycle life and a process for producing the same.

According to the present invention there are provided a lithium secondary battery, which comprises a positive electrode, a negative electrode containing a lithium ion-storable/dischargeable negative electrode-active material and a lithium ion conductive, non-aqueous electrolytic solution or polymer electrolyte, the negative electrode-active material containing a carbonaceous material and particles comprising at least one of elements capable of forming a compound with lithium, the elements having a melting point of at least 900° C. and a thermal expansion coefficient of not more than 9 ppm/K at room temperature (25° C.), the particles being embedded in a plurality of layers of the carbonaceous materials, and the particles together with a carbonaceous material being subjected to a mechanical treatment to make size reduction in advance; a method for using the same in an electric car as a battery assembly; and a process for producing the same.

DETAILED DESCRIPTION OF THE INVENTION

Figure 1:
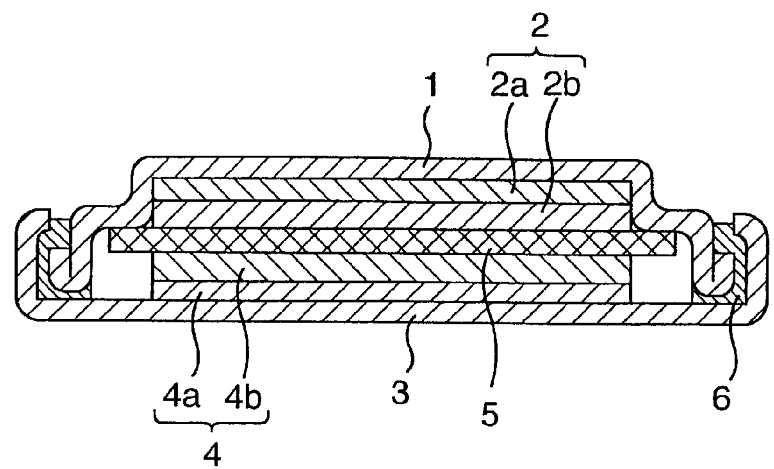
FIG. 1 is a cross-sectional schematic view of a coin type lithium secondary battery according to the present invention.

[1] The present invention provides a lithium secondary battery, which comprises a positive electrode, a negative electrode containing a lithium ion-storable/dischargeable negative electrode-active material and a lithium ion conductive non-aqueous electrolytic solution or polymer electrolyte, the negative electrode-active material containing a carbonaceous material and particles comprising at least one of elements capable of forming a compound with lithium, the elements having a melting point of at least 900° C. and a thermal expansion coefficient of not more than 9 ppm/K at room temperature (25° C.), the particles being embedded in a plurality of layers of the carbonaceous materials, and the particles together with a carbonaceous material being subjected to a mechanical treatment to make size reduction in advance.

The carbonaceous material for embedding said particles comprises a carbonaceous material (A) and a carbonaceous material (B), the carbonaceous material (A) being enclosed by the carbonaceous material (B). The carbonaceous (A) embeds said particles and is enclosed by the carbonaceous material (B), and has a smaller d (002) interplanar spacing by X-ray diffraction than that of the carbonaceous material (B).

The carbonaceous material (A) embedding said particles is enclosed by the carbonaceous material (B), and the carbonaceous material (B) is harder than the carbonaceous material (A).

The carbonaceous material (A) embedding said particles is enclosed by the carbonaceous material (B), where the d (002) interplanar spacing by X-ray diffraction of the carbonaceous material (A) is in a range of 0.335 nm to 0.345 nm.

The carbonaceous material (A) for embedding said particles is enclosed by the carbonaceous material (B), and the carbonaceous material (B) is amorphous.

The element capable of forming a compound with lithium must have a melting point of at least 900° C.; because of the necessity of carbonization treatment at 800° C. or higher after mixing with a carbon precursor and because of suppression of aggregation and agglomeration due to melting and reaction with carbon.

The element capable of forming a compound with lithium must have a thermal expansion coefficient of not more than 9 ppm/K at room temperature (25° C.), because the thermal expansion coefficient of graphite at about room temperature is 3.1 ppm/K and increases with increasing temperature to reach 3.6 ppm/K at 527° C., and thus the element capable of forming a compound with lithium must have a compatibility with the thermal expansion of graphite so as to maintain particulate shapes in the course of carbonization heat treatment and successive cooling and also adhesion of the element to the carbon. Good charging/discharging cycle characteristics can be obtained by satisfying this conditions.

The element capable of forming a compound with lithium is preferably contained in an amount of 55% by weight or less, more preferably less than 30% by weight on the basis of sum total of the negative electrode-active material.

Together with the carbonaceous material, the particles comprising at least one of elements capable of forming a compound with lithium must be, subjected to size reduction in advance by a mechanical treatment, preferably by disintegration using a ball mill, because particle size reduction by the mechanical treatment can give fresh surfaces to the element, thereby improving adhesion of the element to graphite. If the particle sizes of particles comprising the element are 1 μm or less from the beginning, the particles will have a high risk of ignition due to oxidation at the beginning. Formation of an oxide film on the particles comprising the element to prevent ignition leads to deterioration of charging/discharging characteristics because of the increased content of the oxides as a whole.

It is preferable that the element capable of forming a compound with lithium is at least one element selected from Si, Ge and Pt, preferably from Si and Ge.

[2] The present invention provides a process for producing a lithium secondary battery comprising a positive electrode, a negative electrode containing a lithium ion-storable/dischargeable negative electrode-active material and a lithium ion-conductive, non-aqueous electrolytic solution or polymer electrolyte, which comprises producing the negative electrode-active material through a step of embedding particles comprising at least one of elements capable of forming a compound with lithium in a carbonaceous material, and, if necessary, a step of mixing the product resulting from the preceding step with a carbon precursor, followed by carbonization, whereby the negative electrode-active material containing said particles as embedded in the carbonaceous material can be obtained.

The element capable of forming a compound with lithium is at least one element selected from Si, Ge and Pt, preferably Si and Ge and a method for using said lithium secondary battery in an electric car as a battery assembly is included in the present invention as well.

[3] The present invention further provides a lithium secondary battery, which comprises a positive electrode, a negative electrode containing a lithium ion-storable/dischargeable negative electrode-active material and a lithium ion conductive non-aqueous electrolytic solution or polymer electrolyte, the negative electrode-active material containing a carbonaceous material and particles comprising at least one of elements capable of forming a compound with lithium, the particles being embedded in the carbonaceous material and the carbonaceous material comprising a carbonaceous material having a d (002) interplanar spacing by X-ray diffraction of 0.335 nm to 0.345 nm.

The particles are embedded in the carbonaceous material and have an average particle size of not more than 20 μm, the negative electrode-active material has a specific surface area of 1 to 100 $m^2/g$; the carbonaceous material has a peak intensity ratio of 1360 $cm^{-1}$ to 1580 $cm^{-1}$ being 0.15-1.5 by argon laser Raman spectroscopy; and all intensity ratios of X-ray diffraction peak intensities of carbides of the elements capable of forming a compound with lithium as contained in the particles to the background intensity are not more than 5, or the particles are embedded in the carbonaceous material, and have an average particle size of not more than 20 μm; and all intensity ratios of X-ray diffraction peak intensities of carbides of the elements capable of forming a compound with lithium as contained in the particles to the background intensity are not more than 5; the carbonaceous material has a peak intensity ratio of 1360 $cm^{-1}$ to 1580 $cm^{-1}$ being 0.15-1.5 by argon laser Raman spectroscopy; and the negative electrode-active material has a specific surface area of 1 to 100 $m^2/g$, where at least two of the following requirements (1) to (4) are preferably satisfied:

(1) the particles must have an average particle size of not more than 20 μm, (2) all intensity ratios of X-ray diffraction peak intensities of carbides of the elements capable of forming a compound with lithium as contained in the particles to the background intensity must be not more than 5, (3) the carbonaceous material must have a peak intensity ratio of 1360 $cm^{-1}$ to 1580 $cm^{-1}$ being 0.15-1.5 by argon laser Raman spectroscopy, and (4) the negative electrode-active material must have a specific surface area of 1 to 100 $m^2/g$.

[4] The present invention provides a process for producing a lithium secondary battery comprising a positive electrode, a negative electrode containing a lithium ion-storable/dischargeable negative electrode-active material, and a lithium ion conductive non-aqueous electrolytic solution or polymer electrolyte, which comprises producing the negative electrode-active material through a step of repeating mechanical pressure welding of carbonaceous particles and particles containing at least one of elements capable of forming a compound with lithium and, if necessary, a step of heat-treating the product resulting from the preceding step, whereby the negative electrode-active material containing said particles as embedded in the carbonaceous material can be obtained.

The negative electrode-active material is produced by repeating mechanical pressure welding of carbonaceous particles and particles comprising at least one of elements capable of forming a compound with lithium or further by heat treatment at temperatures of 200 to 1,200° C., and the particles comprising the element being embedded in the resulting carbonaceous material, where at least one of the following four conditions are preferably satisfied: i.e., (1) the particles comprising the element has an average particle size of not more than 20 μm, (2) X-ray diffraction intensity ratios of diffraction peaks of carbides of the elements capable of forming a compound with lithium as contained in the particles to the background intensity are not more than 5, (3) a peak intensity ratio of 1360 $cm^{-1}$ to 1580 $cm^{-1}$ of the carbonaceous material is 0.15-1.5 by argon laser Raman spectroscopy, and (4) the negative electrode-active material has a specific surface area of 1 to 100 mg/g, and further the d (002) interplanar spacing by X-ray diffraction of the carbonaceous material is 0.335 nm to 0.345 nm.

The negative electrode-active material is produced by mixing carbonaceous particles and particles comprising at least one of elements capable of forming a compound with lithium with a carbon precursor, followed by carbonization treatment. The negative electrode-active material contains the particles comprising the element as embedded in the resulting carbonaceous material.

The negative electrode-active material is produced by embedding particles containing at least one of elements capable of forming a compound with lithium in a carbonaceous material and then by mixing the resulting product with a carbon precursor, followed by carbonization treatment, where the negative electrode-active material contains the particles as embedded in the carbonaceous material.

The negative electrode-active material is produced by repeating mechanical pressure welding of carbonaceous particles and particles comprising at least one of elements capable of forming a compound with lithium or further by heat treating the resulting product, thereby embedding the particles comprising the element in the carbonaceous material, and further by mixing the resulting product with a carbon precursor, followed by carbonization, whereby the negative electrode-active material containing the particles comprising the element as embedded in the carbonaceous material can be obtained.

[5] The present invention provides a process for producing a lithium secondary battery, which comprises:

(a) a step of mechanically treating a carbonaceous material (A) and at least one of elements capable of forming a compound with lithium, the elements having a melting point of at least 900° C. and a thermal expansion coefficient of not more than 9 ppm/K at room temperature, (b) a step of mixing the particles resulting from the step (a) and a carbonaceous material (B), (c) a step of carbonizing (or carbonization heat treatment) the particles resulting from the step (b), thereby forming a negative electrode-active material, and (d) a step of arranging a positive electrode, a negative electrode containing said negative electrode-active material and a lithium ion conductive, non-aqueous electrolyte solution or polymer electrolyte into a container.

Element capable of forming a compound with lithium is at least one element selected from Si, Ge and Pt, preferably from Si and Ge.

In the above step (a), the term "mechanically treating" means repeating crushing and pressure welding, more concretely, conducting crushing, etc. using a conventional ball mill, a planet type ball mill, an attritor, etc.

For example, particles of an element such as Si, Ge, or the like and a carbonaceous material (A) are placed in a ball mill, and mechanical treatment is conducted until initial mean particle size of Si or Ge particles becomes preferably ½ or less, more preferably ⅕ or less, most preferably 1/10 or less. As to particle size, the mechanical treatment such as crushing is conducted until the particle size becomes preferably 20 μm or less, more preferably 5 μm or less, most preferably 1 μm or less.

After the step (a), heat treatment can be conducted or not conducted. When the heat treatment is conducted, it is preferable to conduct the heat treatment at 200 to 1200° C., more preferably 700 to 1000° C. under non-oxidative atmosphere.

As the carbonaceous material (B) used in the step (b), there can be use a carbon precursor such as tar.

The carbonization (or carbonization heat treatment) in the step (c) can be carried out at preferably 800 to 1500° C., more preferably 900 to 1300° C.

The carbon precursor becomes the carbonaceous material (B) by the above-mentioned carbonization heat treatment.

An electric car with a high voltage and good mileage per one charging can be provided by mounting a battery assembly consisting of the present lithium secondary batteries on the electric car. The present lithium secondary battery can be used also as a battery for hybrid cars.

Members for constituting the present lithium secondary battery will be described in detail below:

FIG. 1 shows the basic structure of a coin type lithium secondary battery according to one embodiment of the present invention.

A positive electrode 2 comprising a positive electrode current collector 2*a* and a positive electrode mix 2*b* is mounted on a positive electrode can 1 by welding, whereas a negative electrode 4 comprising a negative electrode current collector 4*a* and a negative electrode mix 4*b* is mounted on a negative electrode can 3 by welding. Both the positive electrode and the negative electrode are impregnated with an electrolytic solution containing an electrolyte (e.g. $LiPF_6$) dissolved in a solvent mixture of e.g. ethylene carbonate (EC) and dimethyl carbonate (DMC), and then the positive electrode and the negative electrode are counterposed to each other, while interposing a separator 5 therebetween, and the positive electrode can and the negative electrode can are fixed to each other by pressure welding through an insulating gasket 6 to obtain a coin type lithium secondary battery.

Figure 2:
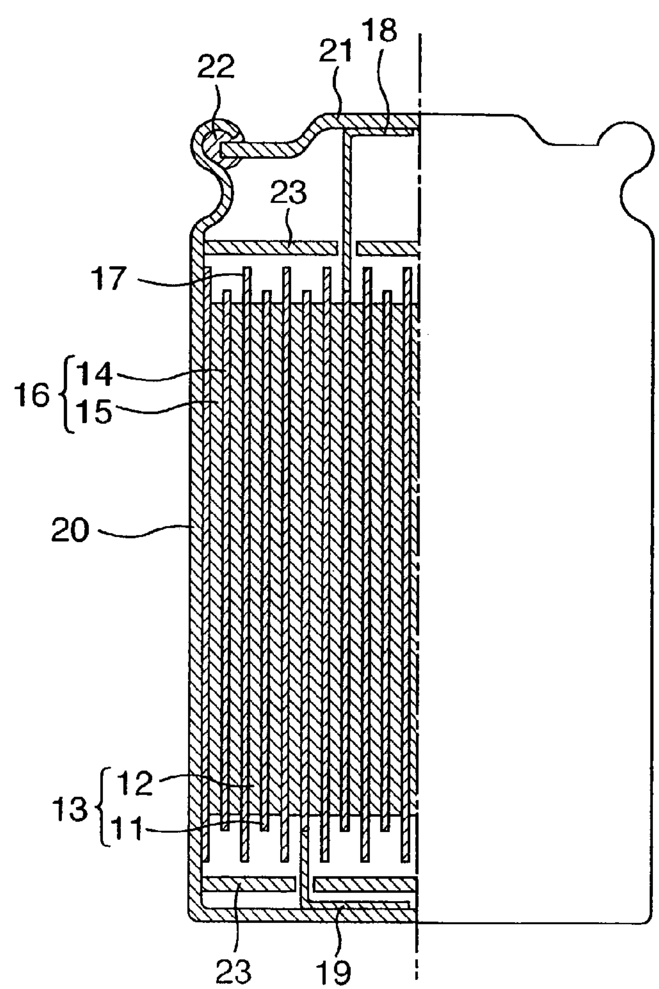
FIG. 2 is a cross-sectional schematic view of a lithium secondary battery according to the present invention.

FIG. 2 shows the basic structure of a cylindrical lithium secondary battery.

Figure 3:
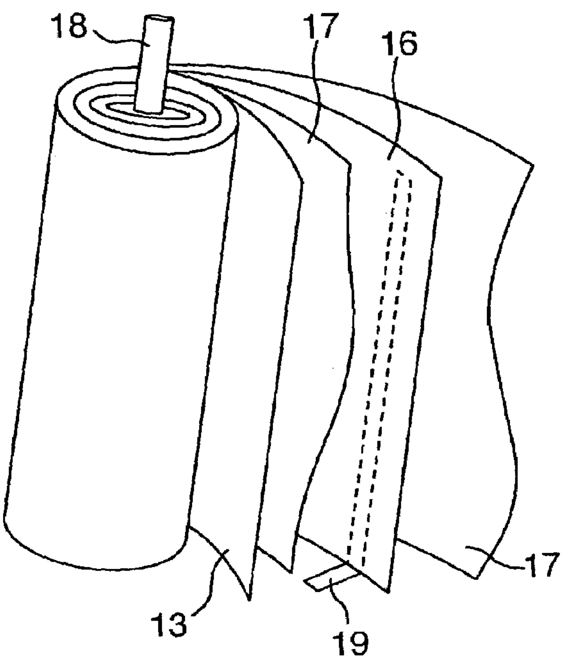
FIG. 3 is an assembly view of a positive electrode, a negative electrode and a separator for the present lithium secondary battery.

An electrode assembly comprises a positive electrode 13 comprising a positive electrode current collector 11 coated with a positive electrode mix 12, a negative electrode 16 comprising a negative electrode current collector 14 coated with a negative electrode mix 15, and a separator 17. The positive electrode 13, the separator 17, the negative electrode 16 and the separator 17 are laminated in this order and coiled as shown in FIG. 3. A positive electrode tab 18 and a negative electrode tab 19 are connected to the positive electrode 13 and the negative electrode 18 of the electrode assembly, respectively. The electrode assembly is encased in a battery can 20, where the negative electrode tab 19 is connected to the battery can 20, whereas the positive electrode tab 18 is connected to a battery lid 21. The battery lid 21 is fixed to the battery can 20 through an insulating gasket 22 to tightly seal the electrode assembly and the inside of the battery can 20. To prevent any contact of the electrode assembly to the battery can 20 or the battery lid 21, an insulating plate 23 is also provided. An electrolytic solution containing Li ions is contained in the tightly sealed battery can. No positive electrode mix is applied to both edge parts of the positive electrode to expose a metallic foil. The positive electrode tab is connected to one of the edge parts.

Figure 4A:
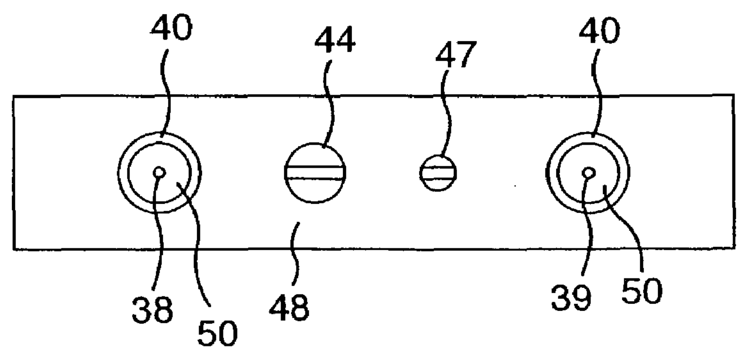
FIGS. 4A and 4B are a top view and a cross-sectional schematic view of a square type lithium secondary battery according to the present invention, respectively.
Figure 4B:
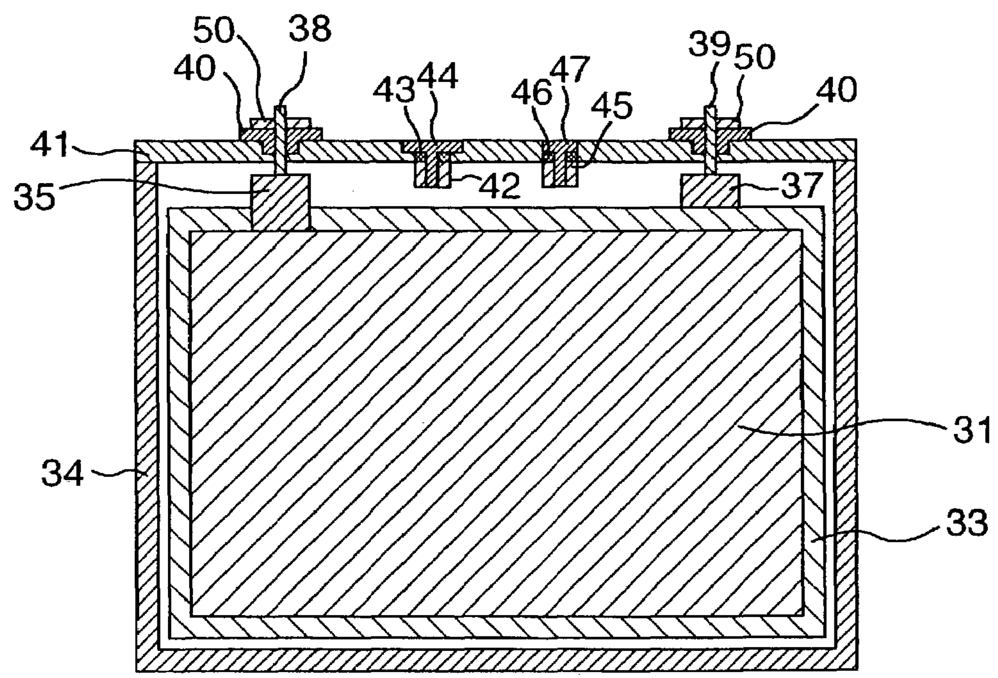

FIG. 4A and FIG. 4B show a top view and a cross-sectional view of a square type lithium secondary battery according to the present invention, respectively.

A square type lithium secondary battery comprises an electrode assembly comprising positive electrode 31 and negative electrode 32 as alternately laminated in a separator 33 and inserted into a battery can 34 made from, e.g. aluminum. Positive electrode leads 35 and negative electrode leads 37 welded to the tops of the respective corresponding electrodes are connected to a positive electrode terminal 38 and a negative electrode terminal 39, respectively. The positive electrode terminal 38 and the negative electrode terminal 39 are inserted into a battery lid 41 through packings 40. An external cable and the battery can be connected to each other by nuts 50 provided at the positive electrode terminal 38 and the negative electrode terminal 39, respectively. The battery lid 41 is provided with a safety valve for discharging a gas accumulated in the battery when the pressure in the battery elevates, and an electrolyte solution inlet. The safety valve comprises a gas discharge outlet port 42, an O-ring 43 and a sealing bolt 44. The electrolytic solution inlet comprises an inlet port 45, an O-ring 46 and a sealing bolt 47. After laser welding of the battery can 34 to the battery lid 41, an electrolytic solution is introduced therein through the inlet port 45 and then the inlet port 45 is tightly closed by the sealing bolt 47, thereby completing the square type lithium secondary battery.

Figure 5:
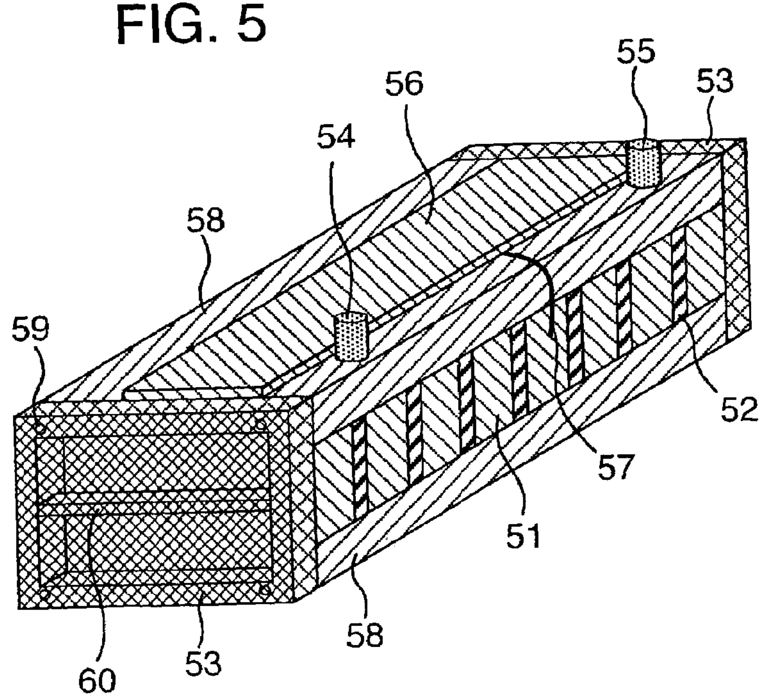
FIG. 5 is a perspective view of a square type lithium secondary battery according to the present invention.

FIG. 5 shows a battery assembly of said square type lithium secondary batteries as connected to one another in series.

A battery assembly of 8 batteries as connected to one another in series is made up by arranging the batteries in a row so that their sides can be counter-posed to one another, while keeping the battery lids 41 of the square type lithium secondary batteries 51 upward.

Two spacers 52 are inserted between the adjacent counter-posed sides of batteries 51 along the height direction. Stainless steel metal plates 53 and fixing parts 58 fixed to the front and the back, and the sides of the battery assembly, respectively, are set and secured by bolts 59 so as to apply an inward pressure to the batteries 51. A rib-formed projection 60 is formed on each of the stainless steel metal plates 53. Positive electrode terminals and negative electrode terminals on the respective square type batteries 51 are connected by electric cables so as to bring all the batteries into series connection with further connection to a positive electrode terminal 54 and a negative electrode terminal 55 of the battery assembly, respectively. Furthermore, the positive electrode terminals and the negative electrode terminals of the respective batteries 51 are connected to a control circuit substrate 56 through a positive electrode voltage input cable and a negative electrode voltage input cable, respectively, and the voltage and the currents of the respective batteries are measured for charge/discharge control of the battery assembly. The control circuit substrate 56 is provided with a microcomputer so as to have a function of stopping the charging/discharging of the battery assembly when one of the voltage and the current of at least one of batteries 51 comes off a given range. A thermocouple 57 is provided on the side of battery at the 4th position from the back end to input its temperature signal to the control circuit substrate 56 so as to stop charging/discharging when the battery temperature exceeds a given temperature. This embodiment is directed to an electrode assembly of a lamination type of strip electrodes, but the same battery assembly as in this embodiment can be made up from a flat, ellipsoidal coil type.

In the present invention, the negative electrode-active material must contain particles comprising at least one of elements capable of forming a compound with lithium.

The element capable of forming a compound with lithium is at least one element selected from Si, Ge and Pt, preferably Si and Ge from the viewpoints of easy handling of powder, a lower production cost, etc. The particles can be composed of a simple substance of the element or alloy or intermetallic compound containing the element, or a mixture of particles composed only of simple substances of the elements, so long as they can interstitially diffuse/release lithium ions in an electrochemical manner.

When the average particle size of the particles comprising at least one of elements capable of forming a compound with lithium contained in the negative electrode-active material exceeds 20 μm, the cycle life of the lithium secondary battery will be considerably shortened. When the average particle size is smaller, the characteristics of the negative electrode-active material will be improved, but too smaller average particle size gives rise to vigorous oxidation in the atmospheric air, making the operation in the negative electrode preparation step unfavorable. Thus, the average particle size is preferably in a range of 0.1 to 20 μm, more preferably in a range of 0.5 to 5 μm.

The particles comprising at least one of elements capable of forming a compound with lithium are embedded in or enclosed by the carbonaceous material, where there are particles completely covered with the carbonaceous material on their surfaces and particles partially exposed to the outside from the surrounding carbonaceous material. Though the particles completely covered with the carbonaceous material on the surfaces are preferably, those partially exposed to the outside from the surrounding carbonaceous material can be used as well. One particle of the negative electrode-active material contains one or a plurality of the particles comprising the element as embedded in the carbonaceous material. Even the presence of a large number of the particles comprising the element does not cause any problem in the characteristics, so long as they are embedded in the carbonaceous material.

The foregoing conditions of the negative electrode-active material can be determined by observing the cross-section of the negative electrode-active material by a scanning electron microscope (SEM).

Particle sizes of particles comprising at least one of elements capable of forming a compound with lithium can be determined a particle size distribution of the particles as observed in the cross-section of the negative electrode-active material, where number of the particles as determined is 500 to 1,500 for each cross-section of negative electrode-active materials. If the presence of carbonaceous material around the particles can be confirmed in the cross-sectional observation of the negative electrode-active material, it can be concluded that said particles are embedded in the carbonaceous material.

Content ratio by weight of the particles to the negative electrode-active material containing the particles as embedded in the carbonaceous material is preferably 0.01 to 0.8, more preferably 0.03 to 0.7, most preferably 0.05 to 0.5, particularly preferably 0.05 to 0.3.

Carbonaceous material (A) containing the particles as embedded therein must contain a crystalline carbon region. When the carbonaceous material (A) is amorphous carbon, it is inferior to the crystalline carbon in the charging/discharging characteristics.

It is preferable that the carbonaceous material (A) has a smaller d (002) interplanar spacing than that of carbonaceous material (B). This means that the carbonaceous material (A) has a higher degree of crystallinity than that of carbonaceous material (B). The d (002) interplanar spacing of carbonaceous material (A) is preferably 0.335 nm to 0.345 nm, more preferably 0.335 nm to 0.340 nm, particularly preferably 0.335 nm to 0.338 nm.

In the present invention, X-ray diffraction method using X-rays based on CuK α beam at a tube voltage of 50 kV and a tube current of 250 mA with steps of 0.002 to 0.01 deg. is used for the determination. Diffraction curves corresponding to diffraction for the d(002) plane interplanar spacing are smoothed, while eliminating the background, thereby obtaining a substantial d(002) diffraction calibration curve. Peak of the calibration curve can be represented by 2θ, where θ is a diffraction angle of the (002) plane. The d(002) interplanar spacing can be obtained according to the following equations:

$$d(002)=\lambda/(2\sin\theta)$$

$$\lambda=0.15418 \text{ nm}$$

A d(002) diffraction peak splits into a plurality of peaks, depending upon carbonaceous material species, but the d(002) interplanar spacing corresponding to a maximum intensity peak is 0.335 nm to 0.345 nm.

On the other hand, the size of crystallite in the C axis direction (Lc) can be obtained from the foregoing calibration curve, using the following equations:

$$Lc=K\cdot\lambda(\beta\cdot\mu\cos\theta)$$

$$K=0.9$$

$$\lambda=0.15418 \text{ nm}$$

$$\beta=\text{half width (radians)}$$

Lc value obtained d from the calibration curve is preferably not less than 0.5 nm, more preferably 1 nm to 100 nm, most preferably 5 nm to 80 nm, particularly preferably 10 nm to 60 nm, especially 15 nm to 50 nm.

Preferably, the carbonaceous material (B) is harder than the carbonaceous material (A). To maintain the functions as the negative electrode-active material, it seems necessary to maintain the shape of the negative electrode-active material by selecting a larder carbonaceous material (B) for the external material and to lessen the strains due to expansion/contraction of particles comprising at least one of elements capable of forming a compound with lithium by selecting a softer carbonaceous material (A) as the internal material.

Hardness of carbonaceous materials is determined by a micro-Vickers hardness tester having a nano-indentation function. At first, a carbonaceous material for embedding particles comprising at least one of elements capable of forming a compound with lithium is embedded in a resin, and then a smooth cross-section is made to expose by mechanical grinding. Then, a desired position of carbonaceous material is tested by the micro-Vickers hardness tester with a pyramid indenter under a load of 0.5 to 5 g. A hardness ratio of the external carbonaceous material to the carbonaceous material near the particles comprising at least one of elements capable of forming a compound with lithium can vary in an appropriate range, depending upon combinations of carbonaceous material (A) with carbonaceous material (B). The hardness ratio of (B) to (A) is preferably not less than 1.1, more preferably not less than 1.1, most preferably 1.2 to 10.0, particularly 1.5 to 5.0.

Degree of crystallinity of carbonaceous material can be evaluated by Raman spectral distribution using an argon laser with a wavelength of 0.5145 nm. Peaks at about 1580 $cm^{-1}$ correspond to a crystal structure of lamination-formed c planes, while peaks at about 1360 $cm^{-1}$ correspond to a disturbed amorphous structure. The peaks at about 1580 $cm^{-1}$ refer to peaks in a range of 1570 to 1620 $cm^{-1}$, whereas the peaks at about 1360 $cm^{-1}$ refer to peaks in a range of 1350 to 1370 $cm^{-1}$. The higher a ratio of crystalline carbon to amorphous carbon, the lower a ratio of peak intensity at about 1360 $cm^{-1}$ to peak intensity at about 1580 $cm^{-1}$ of argon laser Raman spectrum (R value), whereas the higher a ratio of amorphous carbon, the higher the R value. The degree of crystallinity of carbonaceous material (B) can be determined by measuring an argon laser Raman spectrum before and after the coating treatment with the carbonaceous material (B). When R value is higher after the coating treatment with the carbonaceous material (B) than the R value before the coating treatment, the carbonaceous material (B) is composed of amorphous carbon.

Carbonaceous material can be formed by carbonizing a carbon precursor as well. Carbon precursor for use in the present invention includes, for example, easily graphitizable precursors such as petroleum pitch, coal pitch, etc., and non-graphitizable precursors such as isotropic pitch, polyacrylonitrile, phenol resin, furan resin, etc., but the easily graphitizable precursors are preferable for formation of carbonaceous material (A).

When the carbonaceous material (A) is formed from the easily graphitizable precursor, it is preferable to use a non-graphitizable precursor for the formation of carbonaceous material (B). Carbonization temperature of carbon precursor is 800° to 1,500° C., preferably 900° to 1,200° C., because the particles comprising at least one of elements capable of forming a compound with lithium will be formed into carbides or melted at higher temperatures. Carbonization is carried out preferably in such an atmosphere as an inert gas or a nitrogen gas.

Carbonaceous particles can be formed into carbonaceous material in such a state as to bond the particles comprising at least one of elements capable of forming a compound with lithium by mechanical pressure welding. For the carbonaceous particles before the mechanical pressure welding, crystalline carbon and amorphous carbon can be used, but crystalline carbon is preferable.

In mechanical pressure welding of the carbonaceous particles and particles comprising at least one of elements capable of forming a compound with lithium, it is necessary to apply such an external force thereto as to make both particles bond to one another, and thus an apparatus capable of doing such actions must be used. The apparatus for this purpose includes, for example, a planetary type ball will capable of giving mechanical pressure welding when balls collide with one another or with the vessel wall, an apparatus capable of giving mechanical pressure welding between the vessel and the pressure welding spatula provided at a given distance, etc. In the said apparatus, the carbonaceous particles and particles comprising at least one of elements capable of forming a compound with lithium can be subjected to repetitions of mechanical pressure welding, thereby embedding the latter particles into the resulting carbonaceous material.

The carbonaceous material formed on the particles comprising at least one of elements capable of forming a compound with lithium by said mechanical pressure welding has an increased specific surface area, but maintains the physical properties of the original carbonaceous particles to some extent. Particularly in case of carbonaceous particles with smaller particle sizes and larger specific surface area, no negative electrode-active material having desired physical properties can be obtained and thus the carbonaceous particles must have a specific surface area of preferably not more than 100 $m^2/g$, more preferably 0.5 to 50 $m^2/g$. Furthermore, said carbonaceous particles has a d (002) interplanar spacing of preferably 0.335 nm to 0.345 nm, more preferably 0.335 nm to 0.340 nm, most preferably 0.335 nm to 0.337 nm. Heat treatment is not always necessary after the mechanical pressure welding, but it is preferable to conduct heat treatment at 200° to 1,200° C., particularly 900° to 1,100° C. Heat treatment atmosphere can be an inert gas, a nitrogen gas or in vacuum, so long as it can prevent any oxidation.

When the carbonaceous material (A) is formed by the mechanical pressure welding, easily graphitizable precursor or non-graphitizable precursor can be used for the formation of carbonaceous material (B). Particularly, easily graphitizable precursor is preferable.

The larger the specific surface area of the negative electrode-active material obtained in the foregoing procedures, the larger the irreversible capacity, whereas the lower, the more deteriorated the coatability. Thus, the negative electrode-active material must have a specific surface area of preferably 1 to 100 $m^2/g$, more preferably 2 to 50 $m^2/g$. The carbonaceous material must have a d002 interplanar spacing of preferably 0.335 nm to 0.345 nm, more preferably 0.335 nm to 0.340 nm, most preferably 0.335 nm to 0.337 nm.

Various constituent members are required for producing a lithium secondary battery.

Positive electrode-active material for use in the present invention includes composite oxides such as lithium cobalt oxide ($Li_xCoO_2$), lithium nickel oxide ($Li_xNiO_2$), Lithium manganese oxide ($Li_xMn_2O_4$, $Li_xMnO_3$), lithium nickel cobalt oxide ($Li_xNi_yCo_{(1-y)}O_2$), etc., where $o \leqq x \leqq 1.2$ and $o \leqq y \leqq 1$. In other words, they are stoichiometric compositions, but may be oxides slightly deviated from the stoichiometric compositions. These materials have an average particle size of preferably 3 to 40 μm.

Electrolytic solution for use in the present invention includes a solution of a lithium salt as an electrolyte in an organic solvent.

The organic solvent includes, for example, butylene carbonate, propylene carbonate, diethyl carbonate, ethyl methyl carbonate, ethylene carbonate, dimethyl carbonate, methyl carbonate, 1,2-dimethoxyethane, 1,2-diethoxyethane, ethoxymethoxyethane, γ-butyrolactone, γ-valerolactone, dipropyl carbonate, tetrahydrofuran, 2-methyltetrahydrofuran, dioxane, dimethyl sulfoxide, sulfolane, methylsulfolane, acetonitrile, methyl acetate, methyl formate, etc., or solvent mixtures of at least two thereof.

Electrolyte for use in the present invention include lithium salts such as lithium hexafluorophosphate ($LiPF_6$), lithium borofluoride ($LiBF_4$), lithium perchlorate ($LiClO_4$), lithium bis(trifluoromethylsulfonyl)imide ($LiN(CF_2SO_2)_2$), arsenic lithium hexafluoride ($LiAsF_6$), lithium trifluorometasulfonate ($LiCF_2SO_3$), etc. Particularly preferable lithium hexafluorophosphate ($LiPF_6$), lithium borofluoride ($LiBF_4$), lithium perchlorate ($LiClO_4$) and lithium bis(trifluoromethylsulfonyl)imide ($LiN(CF_2SO_2)_2$). Concentration of dissolved electrolyte in organic solvent is preferably 0.5 to 2.0 moles/l.

Electroconductive material for the positive electrode and the negative electrode for use in the present invention includes graphite, amorphous carbon an carbon mixture thereof, and has an average particle size of preferably not more than 30 μm and a specific surface area of preferably 1 to 300 $m^2/g$. Carbon short fibers, 5 to 10 μm in diameter and 10 to 30 μm long, can be preferably used as well.

On the other hand, metallic particles with less reactivity toward the electrolytic solution can be used as an electroconductive material as well. For example, Ni, Co, Fe, Cu, Ti, Cr and alloys containing these can be used for the negative electrode, whereas Ni, Co, Fe, Ti, Cr, Al and alloys containing these can be used for the positive electrode. These metallic particles are hard to undergo deformation of particles by a press and the coatability will be poorer with increasing particle sizes. Thus, they must have an average particle size of preferably not more than 30 μm.

Binder plays a role in connecting an electroconductive material to a current collector. Binder for use in the present invention includes such resins as poly(vinylidene fluoride) (PVDF), ethylene-propylenediene copolymer (EPDM), polytetrafluoroethylene (PTFE), polyethylene, polypropylene, polystyrene, polyvinylpyridine, chlorosulfonated polyethylene, latex, etc. On the basis of total mix consisting of the electrode-active material, the electroconductive material and the binder, an amount of the binder is preferably 2 to 20% by weight. Particularly, the amount of the binder for the positive electrode is more preferably 2 to 10% by weight, whereas that for the negative electrode is more preferably 5 to 15% by weight.

Current collector for use in the negative electrode includes foils and sponge metals of Cu, Ni or stainless steel, whereas that for use in the positive electrode includes foils and sponge metals of Al, Ni or stainless steel. Generally, a combination of a negative electrode current collector of Cu with a positive electrode current collector of Al is preferable. It is preferable from the viewpoint of high strength that these foils are rolled ones, but electrolytic foils can be used as well. The foils have a thickness of preferably not more than 100 μm, particularly preferably 8 to 40 μm.

Separator for use in the present invention includes sheet separators and polymer electrolyte both having a low resistance to the ion conductivity of electrolytic solution, no reactivity toward the electrolytic solution and a distinguished solution retainability. The sheet separators for use in the present invention include, for example, porous films of polypropylene, polyethylene, polyolefin, polyester, polytetrafluoroethylene, polyflon, etc. and non-woven fabrics comprising glass fibers and the foregoing polymers. Particularly preferable are porous films of polypropylene, polyethylene and polyolefin. Polymer electrolytes for use in the present invention include composites comprising a polymer matrix selected from polyethylene oxide, polypropylene oxide, poly (vinylidene fluoride), polyacrylamide, etc. and said electrolyte as dissolved in the polymer matrix, gel cross-linked matrix further containing a solvent, polymer electrolytes grafted with ionically dissociated groups of low molecular weight polyethylene oxide, crown ether, etc. on the polymer main chain and gel state polymer electrolytes comprising a high molecular weight polymer containing said electrolyte therein.

The present lithium secondary battery comprises an electrode assembly formed by lamination from a positive electrode comprising a positive electrode-active material, a positive electrode electroconductive material, a binder and a positive electrode current collector, a negative electrode comprising a negative electrode-active material, a binder, a negative electrode current collector or further a negative electrode electroconductive material, and a separator inserted between the positive electrode and the negative electrode; an electrolytic solution; and a battery container for tightly enclosing the electrode assembly and the electrolytic solution, as connected to the electrode assembly. The electrode assembly can be in a lamination structure of the positive electrode, the separator and the negative electrode, with tabs stuck out from the respective electrodes, or a laminate-coiled structure of the respective electrodes in a tab-connected strip form, or a laminate-wound and subsequently flattened structure of the respective electrodes in a tab-fixed strip form. In other words, any structure can be used, so long as the battery has an electrode assembly with a separator inserted between the counterposed positive and negative electrodes.

The present lithium secondary battery based on a non-aqueous electrolytic solution has a higher capacity and a longer life than those of the conventional lithium secondary battery.

The present lithium secondary battery can be used for various portable electronic appliances, particularly notebook-type personal computers, notebook-type word processors, palm-top (pocket) personal computers, portable telephones, PHS, portable facsimiles, portable printers, headphone stereos, video cameras, portable television receivers, portable CD players, portable MD players, electric shavers, electronic notebooks, transceivers, electric tools, radios, tape recorders, digital cameras, portable copiers, portable video games, etc., or further can be used as secondary batteries for electric cars, hybrid cars, automatic ventors, electric carts, road levelling battery systems, household batteries, spread-type power storing systems (encased in installation-type electric appliances), emergency power supply system, etc.

The present invention will be described in detail below, referring to Examples and Drawings.

EXAMPLE 1

Silicon particles having an average particle size of 10 μm and graphite particles having an average particle size of 20 μm were joined together in a ratio of 50:50 by weight and subjected to a ball mill treatment based on repetitions of mechanical pressure welding using a planetary ball mill for 24 hours. Ball mill vessel and balls were made from stainless steel, and the powder preparation and the ball mill treatment were carried out an Ar atmosphere.

Observation of the cross-section of the resulting composite material by SEM revealed that the silicon particles had an average particles size of 1.2 μm and were embedded in carbonaceous material (graphite particles). X-ray diffraction analysis revealed that peaks showing diffractions of carbon and silicon were observed. It was found that the d (002) interplanar spacing of carbon was 0.3359 nm and the R value was 0.3.

The composite material, petroleum pitch and tetrahydrofuran were mixed together in a ratio of 100:70:500 by weight are stirred under reflux for one hour. Tetrahydrofuran was removed therefrom in a rotary evaporator, followed by vacuum drying at 150° C. for 3 hours, whereby Si—C composite power/pitch composite material was obtained. Then, the composite material was disintegrated to 200-mesh and under in a cutter mill, heated up to 250° C. in air at a rate of 3° C./min and kept at that temperature for one hour. Then, the resulting product was heated up to 1,000° C. in a nitrogen gas stream at a rate of 20° C./h and kept at that temperature for one hour, thereby carbonizing the petroleum pitch. Then, the resulting product was disintegrated to 200-mesh and under in a cutter mill, whereby silicon-carbon composite powder was obtained. X-ray diffraction analysis of the Si—C powder revealed that peaks showing diffractions of carbon and silicon were observed. Diffraction peaks were at d (002) interplanar spacings of 0.3358 nm and 0.3378 nm. It was found that the R value was 0.7 and the specific surface area was 29 $m^2/g$.

In the cross-section of the Si—C composite powder, hardness of carbonaceous material at inward levels of 1 μm and 10 μm from the powder surface was measured by a micro-Vickers hardness tester, and it was found that a hardness ratio of the inward level of 1 μm to that of 10 μm was 1.7.

The Si—C composite powder was kneaded with a solution of PVDF in N-methylpyrrolidone in a ratio of silicon-carbon composite powder:PVDFF 85:15 by weight and the resulting slurry was applied to a 20 μm-thick Cu foil, followed by drying at 120° C. for one hour, press molding into an electrode by a roller press and ultimately blanking to 20 mm in diameter as a negative electrode.

Powder of lithium cobalt oxide $LiCoO_2$ having an average particle size of 10 μm was used as a positive electrode-active material. The powder of lithium cobalt oxide $LiCoO_2$, graphite and PVDF were mixed together in a ratio of $LiCoO_2$:graphite:PVDP=90:6:4 by weight to make a slurry, where PVDF was used in the form of a solution in N-methylpyrrolidone as in the case of the negative electrode. The slurry, after thorough mixing, was applied to a 20 μm-thick Al foil, followed by drying at 120° C. for one hour, press molding into an electrode by a roller press and ultimately blanking to 20 mm in diameter as a positive electrode. A ratio of the positive electrode mix to the negative electrode mix by weight was made to be 15 owing to the large negative electrode capacity.

A coin type battery, as shown in FIG. 1 was made with the negative electrode and the positive electrode to evaluate its characteristics.

A positive electrode 2 comprising a positive electrode current collector **2*a* and a positive electrode mix 2*b* was mounted on a stainless steel positive electrode can 1 by spot welding, whereas a negative electrode 4 comprising a negative electrode current collector 4*a* and a negative electrode mix 4*b* was mounted on a stainless steel negative electrode can 3 by spot welding. Both the positive electrode and the negative electrode were impregnated with an electrolytic solution containing 1 mole/l of $LiPF_6$ dissolved in a 1:2 (by weight) solvent mixture of ethylene carbonate (EC) and dimethyl carbonate (DMC), and then the positive electrode and the negative electrode were counterposed to each other, while interposing a polyethylene separator 5 therebetween, and the positive electrode can and the negative electrode can were fixed to each other by pressure welding through an insulating gasket 6**.

The resulting battery was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery was 10.2 mAh and the irreversible capacity ratio was 12%. On the other hand, a discharge capacity maintenance ratio of the 100th cycle to the 1st cycle was found to be 94%.

EXAMPLE 2

The Si—C composite powder prepared in Example 1, graphite powder having an average particle size of 15 μm and PVDF were mixed together in a ratio of 30:70:10 by weight to make a slurry. A negative electrode was made, using the thoroughly kneaded slurry in the same manner as in Example 1.

A coin type battery was produced, using $LiMn_2O_4$ having an average particle size of 10 μm as a positive electrode material in the same manner as in Example 1.

The battery was subjected to a charging/discharging cycle test by charging with a charge current of 1 mA at a charge end voltage of 4.3 V and discharging with a discharge current of 1 mA at a discharge end voltage of 2.8 V. As a result, it was found that the initial charge capacity of the battery was 4.5 mAh and a ratio of the irreversible capacity was 10%. On the other hand, a discharge capacity maintenance ratio of the 100th cycle to the 1st cycle was found to be 97%.

EXAMPLE 3

Ge particles having an average particle size of 1 μm, coal pitch and tetrahydrofuran were mixed together in a ratio of 100:100:500 by weight and stirred under reflux for one hour. Tetrahydrofuran was removed therefrom in a rotary evaporator, followed by vacuum drying at 150° C. for 3 hours, thereby obtaining a Ge—C composite powder/pitch composite material. The composite material was pulverized to 200-mesh and under in a cutter mill, heated up to 250° C. in air at a rate of 3° C./min and maintained at that temperature for one hour. The resulting product was heated up to 1,200° C. in a nitrogen gas stream at a rate of 20° C./hr and maintained at that temperature for one hour, thereby carbonizing the pitch. Then, the carbonized product was pulverized to 200-mesh and under in a cutter mill, thereby obtaining a composite material. Analysis of the resulting composite material by wide angle X-ray diffraction revealed that peaks showing diffractions of C and Ge were observed. The d (002) interplanar spacing of C was found to be 0.3410 nm. Average particle size of Ge determined by cross-sectional observation was found to be 3.1 μm, and the R value was found to be 1.0. Said composite material and phenol resin were mixed together in a ratio of 100:100 by weight, followed by vacuum drying at 120° C. for 3 hours, thereby obtaining a composite material/resin composite material.

The resulting composite material was disintegrated to 200-mesh and under in a cutter mill, heated up to 250° C. in air at a rate of 3° C./min. and maintained at that temperature for one hour. Then, the resulting product was heated up to 1,000° C. in a nitrogen gas stream at a rate of 20° C./hr and maintained at that temperature for one hour, thereby carbonizing the resin. The carbonized product was disintegrated to 200-mesh and under in a cutter mill, thereby obtaining Ge—C composite powder. Analysis of the composite powder by X-ray diffraction revealed that peaks showing diffractions of C and Ge were observed. The d (002) interplanar spacing of C was found to be 0.3450 nm with an R value of 1.5 and a specific surface area of 8 $m^2$/g.

On the other hand, in the cross-section of the Ge—C composite powder, hardness at inward levels of 1 μm and 10 μm from the powder surface was measured by a micro-Vickers hardness tester, and a hardness ratio of the inward level of 1 μm to that of 10 μm was found to be 1.5.

A battery was produced, using the Ge—C composite powder as a negative electrode-active material in the same manner as in Example 1, but an electrolytic solution containing 1.5 moles/l of $LiPF_6$ dissolved in a 2:3 (by weight) solvent mixture of PC and DM was used for the electrolytic solution.

The resulting lithium secondary battery was subjected to a charging/discharging cycle test by charging with a charge current of 2 mA at a charge end voltage of 4.2 V and discharging with a discharge current of 2 mA at a discharge end voltage of 2.7 V. As a result, it was found that the initial discharge capacity of the battery was 7.2 mAh and the irreversible capacity ratio was 15%. On the other hand, a discharge capacity maintenance ratio of the 100th cycle to the 1st cycle was found to be 92%.

COMPARATIVE EXAMPLE 1

Si particles having an average particle size of 10 μm and graphite particles having an average particle size of 20 μm were mixed together in a ratio of 80:20 by weight and subjected to a ball mill treatment for 96 hours, where the ball mill vessel and balls were made from stainless steel and the powder preparation and the ball mill treatment were carried out in an Ar atmosphere. Analysis of the resulting Si—C composite powder by wide angle X-ray diffraction revealed that peaks showing diffractions of C and Si were observed. The d (002) interplanar spacing of C was found to be 0.3361 nm and the average particle size of Si determined by cross-sectional observation was found to be 0.9 μm, with an R value of 0.9 and a specific surface area of Si—C composite powder being 280 $m^2$/g.

A battery was produced, using the Si—C composite powder as a negative electrode-active material in the same manner as in Example 1, but an electrolytic solution containing 1.5 moles/l of $LiPF_6$ in a 1:2 (by weight) solvent mixture of EC and DMC was used for the electrolytic solution.

The battery was subjected to a charging/discharging cycle test by charging with a charge current of 2 mA at a charge end voltage of 4.2 V and discharging with a discharge current of 2 mA at a discharge end voltage of 2.7 V. As a result, it was found that the initial discharge capacity of the battery was 13.6 mAh and the irreversible capacity was 53%. A discharge capacity maintenance ratio of the 100th cycle to the 1st cycle was found to be 23%.

EXAMPLE 4

A cylindrical lithium secondary battery was produced as a lithium secondary battery according to the present invention, and its basic structure is shown in FIG. 2.

An electrode assembly comprised a positive electrode 13 comprising a positive electrode current collector 11 coated with a positive electrode mix 12, a negative electrode 16 comprising a negative electrode current collector 14 coated with a negative electrode mix 15 and a separator 17. The positive electrode 13, the separator 17, the negative electrode 16 and the separator 17 were laminated in this order and coiled as shown in FIG. 3. A positive electrode tab 18 and a negative electrode tab 19 were connected to the positive electrode and the negative electrode 16 of the electrode assembly, respectively. The electrode assembly was encased in a battery can 20, where the negative electrode tab 19 was connected to the battery can 20, whereas the positive electrode tab 18 was connected to a battery lid 21. The battery lid 21 was fixed to the battery can 20 through an insulating gasket 22 to tightly seal the electrode assembly and the inside of the battery can 20. To prevent any contact of the electrode assembly to the battery can 20 or the battery lid 21, an insulating plate 23 was also provided. An electrolytic solution containing Li ions was contained in the tightly sealed battery can. For the battery can 20 and the battery lid 21, SUS 304, SUS 316, mild steel with an anticorrosive coating, etc. could be used.

Lithium cobalt oxide $LiCoO_2$ having an average particle size of 10 μm as a positive electrode-active material, scale-form graphite having an average particle size of 5 μm as a positive electrode electroconductive material, PVDF as a binder and a 20 μm-thick Al foil as a positive electrode current collector were used. A mixture of $LiCoO_2$, scale-form graphite and PVDF in a ratio of 88:7:5 by weight was mixed with N-methylpyrrolidone to prepare a slurry of positive electrode mix. The slurry was applied to both sides of the Al foil, followed by vacuum drying at 120° C. for one hour and successive press molding into an electrode piece by a roller press. Then, a strip, 40 mm wide and 285 mm long, was cut out of the electrode piece to prepare a positive electrode, where the Al foil was exposed in 10 mm-long, positive electrode mix-uncoated regions at both edges of the positive electrode. A Ni positive electrode tab was pressure welded to one end of the positive electrode by ultrasonic welding.

Negative electrode-active material was prepared in the following manner. Si particles having an average particle size of 10 μm and graphite particles having an average particle size of 20 μm were joined together in a ratio of 80:20 by weight and subjected to a ball mill treatment for 48 hours, where the ball mill vessels and balls were made from stainless steel and the powder preparation and ball mill treatment were carried out in an Ar atmosphere. Analysis of the resulting composite material by wide angle X-ray diffraction revealed than the d (002) interplanar spacing of C was 0.3356 nm. Then, the composite material, petroleum pitch and tetrahydrofuran were mixed together in a ratio of 100:200:700 by weight and stirred under reflux for one hour. Tetrahydrofuran was removed therefrom in a rotary evaporator, followed by vacuum drying at 150° C. for 3 hours, thereby obtaining a composite material/pitch composite material.

Then, the composite material was pulverized to 200-mesh and under in a cutter mill, heated up to 250° C. in air at a rate of 3° C./min. and maintained at that temperature for one hour. The product was heated up to 1,000° C. in a nitrogen gas stream at a rate of 20° C./h and maintained at that temperature for one hour, thereby carbonizing the pitch. The carbonized product was disintegrated to 200-mesh and under in a cutter mill, thereby obtaining a Si—C composite powder. The Si—C composite powder was used as a negative electrode-active material.

Analysis of the negative electrode-active material revealed that peaks showing diffractions of C and Si were observed. The d (002) interplanar spacing of C was found to be 0.3358 nm, and the average particle size of Si determined by cross-sectional observation was found to be 1.8 μm, with an R value of 1.3 and a specific surface area of 9 $m^2/g$. On the other hand, a carbonaceous material hardness ratio of the inward level of 1 μm from the powder surface to that of 10 μm was found to be 1.3.

The negative electrode-active material, scale-form graphite having an average particle size of 10 μm as a negative electrode electroconductive material, PVDF as a binder and a 20 μm-thick Cu foil as a negative electrode current collector were used. The negative electrode-active material, the scale-form graphite and PVDF were mixed together in a ratio of 60:30:10 by weight together with N-methylpyrrolidone to prepare a slurry of negative electrode mix. The slurry was applied to both sides of the Cu foil, followed by vacuum drying at 120° C. for one hour and subsequent press molding into an electrode piece by a roller press. Then A negative electrode, 40 mm wide and 290 mm long, was cut of the electrode piece, thereby preparing the negative electrode. A ratio of the applied negative electrode mix to the applied positive electrode mix was 1:10 by weight. The Cu foil was exposed in 10 mm-long, negative electrode mix-uncoated regions at both edges of the negative electrode, as in the case of the positive electrode. A Ni negative electrode tab was pressure welded to one end of the negative electrode by ultrasonic welding.

A porous polypropylene film, 25 μm thick and 44 mm wide, was used as a separator. As an electrolytic solution, a solution containing 1 mole/l of $LiPF_6$ dissolved in a 1:2 (by weight) solvent mixture of EC and DMC was used.

The lithium secondary battery thus produced was subjected to repetitions of charging/discharging with a charge/discharge current of 300 mA at a charge end voltage of 4.2 V and a discharge end voltage of 2.8 V. As a result, a maximum discharge capacity was found to be 1357 mAh and a discharge capacity maintenance ratio of the 200th cycle to the maximum discharge capacity was found to be 86%.

COMPARATIVE EXAMPLE 2

For comparison, scale-form graphite having an average particle size of 20 μm was used for the negative electrode-active material. A negative electrode was prepared by adjusting a ratio of the negative electrode-active material to PVDF to 90:10 by weight, and a lithium secondary battery was produced in the same manner as in Example 4, where a ratio of the negative electrode mix to the positive electrode mix was 1:2 by weight.

The lithium secondary battery was subjected to repetitions of charging/discharging with a charge/discharge current of 300 mA at a charge end voltage of 4.2 V and a discharge end voltage of 2.8 V. As a result, a maximum discharge capacity was found to be 734 mAh. A discharge capacity maintenance ratio of the 200th cycle to the maximum discharge capacity was found to be 85%.

The results show that the present lithium secondary battery has a high capacity and also equivalent or superior cycle characteristics, as compared with the conventional ones.

EXAMPLE 5

A square type battery was produced as a lithium secondary battery according to the present invention.

A mixture of lithium cobalt oxide $LiCoO_2$ having an average particle size of 10 μm, scale-form graphite and PVDF in a ratio of 90:6:4 by weight was mixed with N-methylpyrrolidone and thoroughly kneaded to prepare a slurry. The slurry was applied to both sides of a 20 μm-thick Al foil by a doctor blade method and dried at 100° C. for 2 hours. The positive electrode was in a strip form, 70 mm×120 mm.

A negative electrode-active material was prepared in the following manner. Si particles having an average particle size of 1 μm and graphite particles having an average particle size of 1 μm were joined together in a ratio of 30:70 by weight and subjected to a ball mill treatment for 24 hours, where the ball mill vessel and balls were made from stainless steel, and the powder preparation and the ball mill treatment were carried out in an Ar atmosphere. The resulting composite material, petroleum pitch and tetrahydrofuran were mixed together in a ratio of 100:50:500 by weight and stirred under reflux for one hour. Tetrahydrofuran was removed therefrom in a rotary evaporator, followed by vacuum drying at 150° C. for 3 hours, thereby obtaining a Si—C composite powder/pitch composite material. The composite material was disintegrated to 200-mesh and under by a cutter mill, then heated up to 250° C. in air at a rate of 3° C./min and maintained at that temperature for one hour. Then, the product was heated up to 1,100° C. in a nitrogen gas stream at a rate of 20° C./h and maintained at that temperature for one hour, thereby carbonizing the pitch. The carbonized product was disintegrated to 200-mesh and under by a cutter mill, thereby obtaining a Si—C composite powder.

The negative electrode-active material, PVDF as a binder and a 20 μm-thick Cu foil as a negative electrode current collector were used. The negative electrode-active material and PVDF were mixed together in a ratio of 90:10 by weight together with N-methylpyrrolidone to prepare a slurry of negative electrode mix. The slurry was applied to both sides of the Cu foil by a doctor blade method and dried at 100° C. for 2 hours. The negative electrode was in a strip form, 70 mm×120 mm.

FIGS. 4A and 4B are the top view and the cross-sectional view of a square form lithium secondary battery, respectively.

The square form lithium secondary battery had such outside dimensions as 100 mm high, 130 mm wide and 30 mm deep. An electrode assembly comprising positive electrodes 31 and negative electrodes 32 as alternately laminated in a bag-formed polyethylene separator 33 was inserted into an Al battery can 34, where a ratio of positive electrode mix to negative electrode mix was 5:1 by weight. Positive electrode leads 35 and negative electrode leads 37 welded to the tops of the respective corresponding electrodes were connected to a positive electrode terminal 38 and a negative electrode terminal 39, respectively. The positive electrode terminal 38 and the negative electrode terminal 39 were inserted into a battery lid 41 through polypropylene packings 40. An external cable and the battery can could be connected to each other by nuts 50 provided at the positive electrode terminal 38 and the negative electrode terminal 39, respectively. The battery lid 41 was provided with a safety valve for discharging a gas accumulated in the battery when the pressure in the battery reaches 4-7 atmospheres and an electrolytic solution inlet. The safety valve comprised a gas discharge outlet port 42, an O-ring 43 and a sealing bolt 44. The electrolytic solution inlet comprised an inlet port 45, an O-ring 46 and a sealing bolt 47. After laser welding of the battery can 34 to the battery lid 41, an electrolytic solution was introduced therein through the inlet port 45 and then the inlet port 45 was tightly closed by the sealing bolt 47, thereby completing the square type lithium secondary battery. The electrolytic solution used was a solution containing 1 mole/l of $LiPF_6$ dissolved in a 1:2 (by weight) solvent mixture of EC and DMC. The battery had an average discharge voltage of 3.4 V and a rated capacity of 38 Ah with 130 Wh.

The square type lithium secondary batteries 51 were arranged in a row so that their 100 mm×130 mm sides could be counterposed to one another while keeping the battery lids 41 upward to make up a battery assembly of 8 batteries as conned to one another in series, as shown in FIG. 5. Two polytetrafluoroethylene spacers 52, 2 mm×10 mm×100 mm, were inserted between the adjacent counterposed sides of batteries 51 along the height direction. Stainless steel metal plates 53 and polytetrafluoroethylene fixing parts 58 fixed to the front and the back, and the sides of the battery assembly, respectively, were set and secured by bolts 59 so as to apply an inward pressure to the batteries 51. A rib-formed projection 60 was formed on each of the stainless steel metal plates 53. Positive electrode terminals and negative electrode terminals on the respective square type batteries 51 were connected by electric cables so as to bring all the batteries into series connection with further connection to a positive electrode terminal 54 and a negative electrode terminal 55 of the battery assembly, respectively. Furthermore, the positive electrode terminals and the negative electrode terminals of the respective batteries 51 were connected to a control circuit substrate 56 through a positive electrode voltage input cable and a negative electrode voltage input cable, respectively, and the voltage and the currents of the respective batteries were measured for charge/discharge control of the battery assembly. The control circuit substrate 56 was provided with a microcomputer so as to have a function of stopping the charging/discharging of the battery assembly when one of the voltage and the current of at least one of batteries 51 comes off a given range. A thermocouple 57 was provided on the side of battery at the 4th position from the back end to input its temperature signal to the control circuit substrate 56 so as to stop charging/discharging when the battery temperature exceeds a given temperature. The battery assembly had an average discharge voltage of 27.2 V and a rated capacity of 38 Ah with 1,030 Wh.

This example shows that the electrode assembly was of a lamination type of strip electrodes, but the same battery assembly as in this example can be made up from a flat, ellipsoidal coil type.

COMPARATIVE EXAMPLE 3

Square type lithium secondary batteries and their battery assembly were produced in the same manner as in Example 5, but scale-form graphite having an average particle size of 20 μm was used for the negative electrode-active material and a ratio of the negative electrode mix to the positive electrode mix was 1:2 by weight.

The square type battery had an average discharge voltage of 3.7 V and a rated capacity of 27 Ah with 100 Wh. The battery assembly had an average discharge voltage of 29.6 V with a rated capacity of 27 Ah with 800 Wh.

EXAMPLE 6

A positive electrode, 5,000 mm long and 150 mm wide, and a negative electrode, 5,100 mm long and 155 mm wide, were prepared in the same manner as in Example 5.

Figure 6:
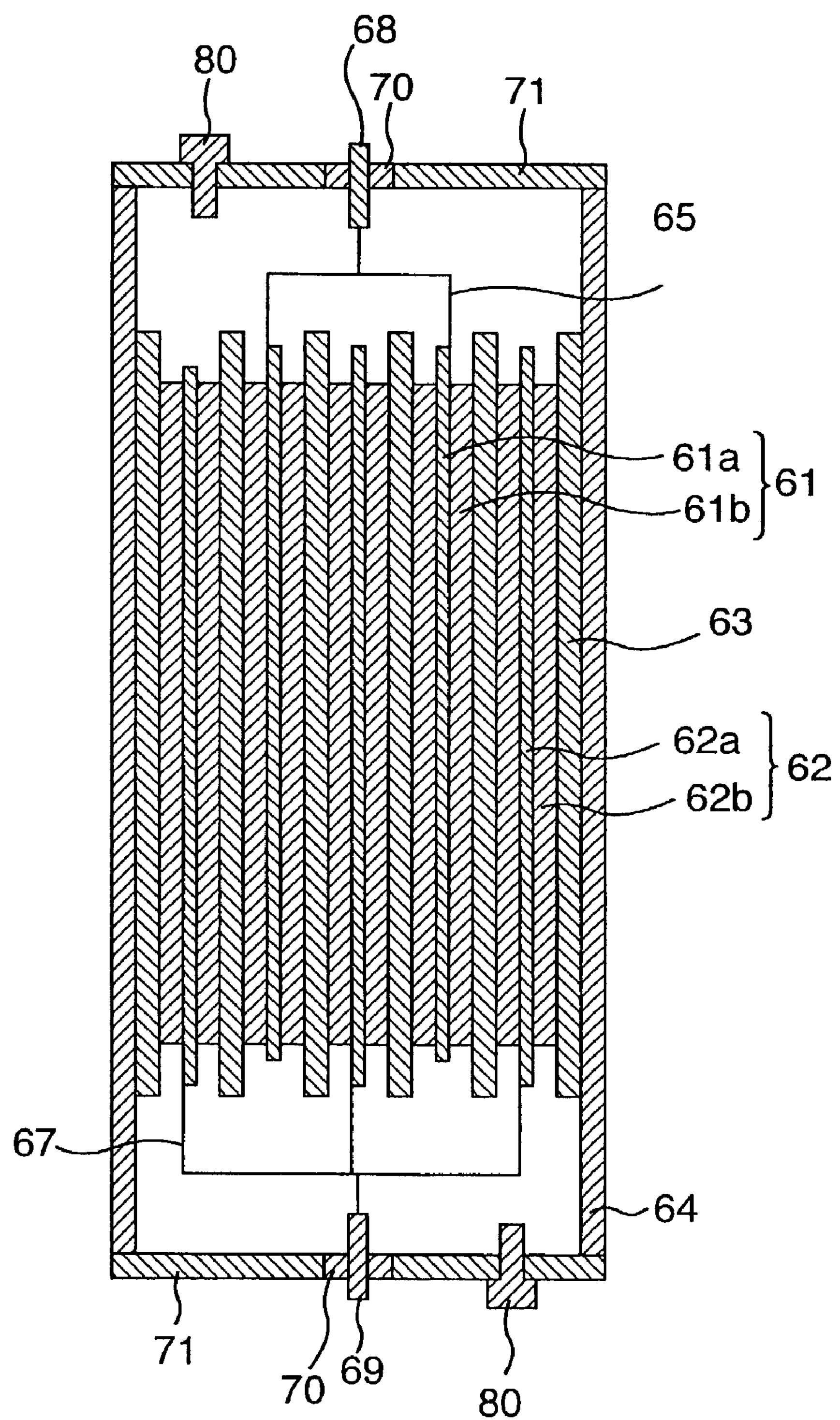
FIG. 6 is a cross-sectional schematic view of a cylindrical type lithium secondary battery according to the present invention.

FIG. 6 shows a cross-sectional view of a cylindrical type lithium secondary battery according to the present invention. The outside dimensions of the battery were 200 mm high and 60 mm in diameter.

An electrode assembly was in a coiled structure comprising a positive electrode 61 comprising a positive electrode current collector 61*a* and a positive electrode mix 61*b*, a negative electrode 62 comprising a negative electrode current collector 62*a* and a negative electrode mix 62*b*, the positive electrode 61 and the negative electrode 62 being coiled through a separator 63 therebetween.

Positive electrode leads 65 and negative electrode leads 67 welded to the top of the respective corresponding electrodes were provided at positions opposite to each other at a rate of 10 band-formed leads per electrode. The positive electrode leads 65 and the negative electrode leads 67 as a whole were welded to a positive electrode terminal 68 and a negative electrode terminal 69, respectively. The positive electrode terminal 68 and the negative electrode terminal 69 were fixed to a battery lid 71 in an insulated state by polypropylene packings. After laser welding of a tubular Al battery can 64 to the battery lid 71, the battery inside was evacuated in vacuum, while keeping a safety valve 80 having both functions of releasing the inside pressure and sealing the inlet for an electrolytic solution off the battery lid 71, and then the electrolytic solution was quickly introduced into the battery. Then, the safety valve 80 was fixed to the battery lid 71 to tightly close the battery. The safety valve can release the gas when the inside pressure of the battery reaches 3-7 atmospheres. The cylindrical type battery had an average discharge voltage of 3.4 V and a rated capacity of 38 Ah with 130 Wh.

Figure 7A:
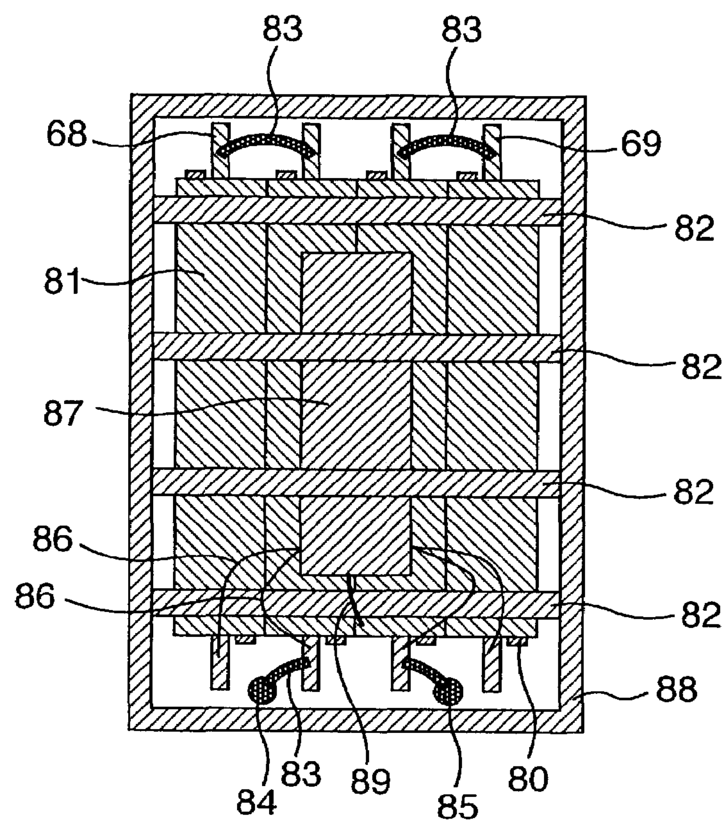
FIG. 7A and FIG. 7B are a top view and a cross-sectional view of a cylindrical type lithium secondary battery assembly according to the present invention, respectively.
Figure 7B:
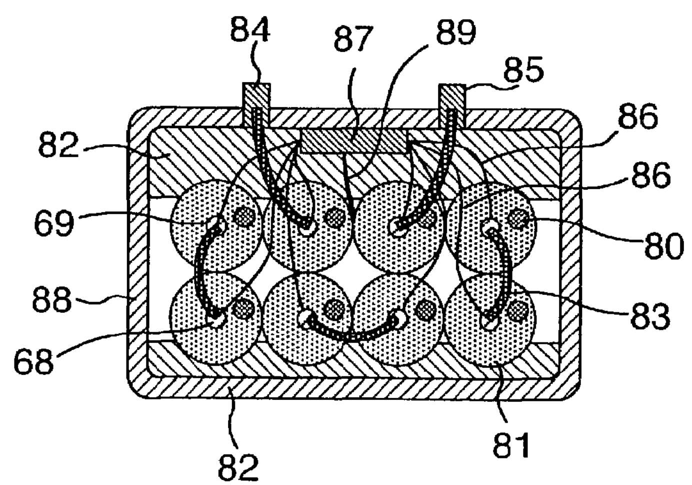

FIGS. 7A and 7B show the top view and the cross-sectional view of a battery assembly of the cylindrical type lithium secondary batteries. The battery assembly was in such a structure that total 8 cylindrical type batteries were arranged so that 4 thereof could take the upper position and the remaining 4 could take the lower position. Polytetrafluoroethylene fixing parts 82 were arranged as shown in FIGS. 7*a* and 7*b* to fix 8 batteries 81. The positive electrode terminals 68 and the negative electrode terminals 69 of cylindrical type batteries 81 were connected by electric cables 83 so as to bring all the batteries into series connection with further connection to a positive electrode terminal 84 and a negative electrode terminal 85 of the battery assembly, respectively. To shorten the lengths of the electric cables 83 of the cylindrical type batteries, the direction of the positive electrode terminals and the negative electrode terminals of the respective batteries 81 were alternated. The positive electrode terminals 68 and the negative electrode terminals 69 of the respective batteries 81 were connected to a control circuit substrate 87 through voltage input cables 86, respectively, to measure voltages of the respective batteries for charge/discharge control of the battery assembly. A thermocouple 89 was fixed to the inside surface of the battery arranged at the upper position to input its temperature signal to the control circuit substrate 87. The control circuit substrate 87 was provided with a microcomputer so as to have a function of stopping the charging/discharging of the battery assembly when the voltage of the batteries as a whole and the inside temperature of the battery assembly come off a given range. The battery assembly had an average discharge voltage of 27.2 V and a rated capacity of 38 Ah with 1,030 Wh. In FIGS. 7A and 7B, numeral 80 denotes a safety valve, 85 negative electrode terminal, 84 positive electrode terminal and 88 a container.

EXAMPLE 7

12 sets of battery assemblies having the same specification as in Example 6 were produced and arranged in series connection to provide a battery assembly module. The battery assembly module was mounted on an electric car. The battery assembly module was provided on the bottom of the electric car body. By operating a control unit with a wheel by a driver, an output from the battery assembly module was adjusted to transmit power to a converter. By utilizing the power from the converter, the motor and wheels were driven to drive the electric car. When the electric car was driven at a rated capacity of 80% by one charging, the capacity reduction ratio of the battery assemblies was 2-5% after 100 runs of driving.

EXAMPLE 8

Si particles having an average particle size of 10 μm and graphite particles having an average particle size of 20 μm were joined together in a ratio of 50:50 by weight and subjected to repetitions of mechanical pressure welding in a planetary ball mill for 24 hours, where the ball mill vessel and balls were made from stainless steel, and the powder preparation and the ball mill treatment were carried out in an Ar atmosphere.

Analysis of the resulting Si—C composite powder by wide angle X-ray diffraction revealed that peaks showing diffractions of C and Si were observed. The d (002) interplanar spacing of C was found to be 0.3358 nm and Lc was found to be 45 nm. No silicon carbide diffraction peaks were observed. The R value was found to be 0.3. As a result of observing the cross-section of the composite powder, it was found that the Si particles were embedded in the carbonaceous material and had an average particle size of 1.2 μm, though the actual average particle size seems to be more than 12 μm. The Si—C composite powder had a specific surface area of 63 $m^2/g$.

The Si—C composite powder and a solution of PVDF in N-methylpyrrolidone were kneaded in a ratio of Si—C composite power:PVDF=85:15 by weight and the resulting slurry was applied to a 20 μm-thick Cu foil, followed by drying at 120° C. for one hour, press molding into an electrode piece by a roller press and ultimate blanking of the electrode piece into a negative electrode, 20 mm in diameter.

$LiCoO_2$ powder having an average particle size to 10 μm was used for a positive electrode-active material. The $LiCoO_2$ powder, graphite and PVDF were mixed together in a ratio of 90:6:4 by weight to form a slurry. PVDF was used in solution in N-methylpyrrolidone as in the case of the negative electrode. The slurry was thoroughly kneaded and applied to a 20 μm-thick Al foil, followed by drying at 120° C. for one hour, press molding into an electrode piece by a roller press and ultimate blanking of the electrode piece into a positive electrode, 20 mm in diameter. A ratio of the positive electrode mix to the negative electrode mix was 15 owing to the larger negative electrode capacity.

The negative electrode and the positive electrode so prepared were built into a coin type battery as shown in FIG. 1 to evaluate their characteristics. A positive electrode 21 comprising a positive electrode current collector 2*a* and a positive electrode mix 2*b* was mounted on a stainless steel positive electrode can 1 by spot welding, whereas a negative electrode 4 comprising a negative electrode current collector 4*a* and a negative electrode mix 4*b* was mounted on a stainless steel negative electrode can 3 by spot welding. Both the positive electrode and the negative electrode were impregnated with an electrolytic solution containing 1 mole/l of $LiPF_6$ in a 1:2 (by weight) solvent mixture of ethylene carbonate (EC) and dimethyl carbonate (DMC) and counterposed to each other through a polyethylene separator 5 therebetween. The positive electrode and the negative electrode can were pressure welded to each other through an insulating gasket 6.

The resulting battery was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery was 12.5 mAh and the irreversible capacity ratio was 24%. On the other hand, a discharge capacity maintenance ratio of the 100th cycle to the 1st cycle was found to be 85%.

EXAMPLE 9

Si particles having an average particle size of 1 μm and graphite particles having an average particle size of 20 μm were joined together in a ratio of 80:20 by weight and subjected to a ball mill treatment in a planetary ball mill for 48 hours, and then admixed with the same amount of the treated particles and further subjected to the ball mill treatment for 12 hours, where the ball mill vessel and balls were made from stainless steel and the powder preparation and the ball mill treatment were carried out in an Ar atmosphere.

Analysis of the resulting Si—C composite powder by wide angle X-ray diffraction revealed that peaks showing diffractions of C and Si were observed. The d (002) interplanar spacing of C was found 0.3352 nm and Lc was found to be 52 nm. No silicon carbide diffraction peaks were observed. The R value was found to be 0.25. As a result of observing the cross-section of the composite powder, it was found that the Si particles were embedded in the carbonaceous material and had an average particle size of 0.7 μm. The Si—C composite powder had a specific surface area of 49 $m^2/g$.

A battery using the Si—C composite powder as a negative electrode-active material was produced in the same manner as in Example 8, where $LiCoO_2$ having an average particle size of 10 μm was used for the negative electrode-active material, but a solution containing 1 mole/l of $LiCPO_4$ in a 1:2 (by weight) solvent mixture of EC and DMC was used as an electrolytic solution.

The lithium secondary battery so produced was subjected to a charging/discharging cycle test by charging with a charge current of 1 mA at a charge end voltage of 4.2 V and discharging with a discharge current of 1 mA at a discharge end voltage of 2.7 V. As a result, the initial discharge capacity of the battery was found to be 11.0 mAh and the irreversible capacity ratio was found to be 20%. On the other hand, a discharge capacity maintenance ratio of the 100th cycle to the 1st cycle was found to be 88%.

EXAMPLE 10

The Si—C composite powder prepared in Example 8, coal pitch and tetrahydrofuran were mixed together in a ratio of 100:30:300 by weight and stirred under reflux for one hour. Tetrahydrofuran was removed therefrom in a rotary evaporator, followed by vacuum drying at 150° C. for 3 hours, thereby obtaining a Si—C composite powder/pitch composite material. Then, the composite material was disintegrated to 200-mesh and under in a cutter mill, heated up to 250° C. in air at a rate of 3° C./min and maintained at that temperature for one hour. Then, the product was heated up to 1,000° C. in a nitrogen gas stream at a rate of 20° C./h and maintained at that temperature, thereby carbonizing the pitch. The carbonized product was disintegrated to 200-mesh and under in a cutter mill, thereby obtaining a Si—C composite powder. Analysis of the resulting Si—C composite powder by X-ray diffraction revealed that peaks showing diffractions of C and Si were observed. The d (002) interplanar spacing of C was found to be 0.3359 nm and 0.3365 nm as two peaks. No silicon carbide diffraction peaks were observed. The R value was found to be 0.6 and the Si—C composite powder had a specific surface area of 35 $m^2/g$.

A battery using the Si—C composite powder as a negative electrode-active material was produced in the same manner as in Example 8, but $LiNi_{0.8}Co_{0.2}O_2$ having an average particle size of 10 μm was used as a positive electrode-active material, and a solution containing 1 mole/l of $LiPF_6$ in a 3:6:1 (by weight) solvent mixture of EC, DMC and DEC was used as an electrolytic solution.

The battery so produced was subjected to a charging/discharging cycle test by charging with a charge current of 1 mA at a charge end voltage of 4.15 V and discharging with a discharge current of 1 mA at a discharge end voltage of 2.8 V. As a result, it was found that the initial discharge capacity of the battery was 10.2 mAh and the irreversible capacity ratio was 19%. On the other hand, a discharge capacity maintenance ratio of the 100th cycle to the 1st cycle was found to be 92%.

EXAMPLE 11

The Si—C composite powder prepared in Example 10, graphite powder having an average particle size of 15 μm and PVDF were mixed together in a ratio of 30:70:10 by weight to prepare a slurry. After thorough kneading of the slurry, a negative electrode was prepared, using the slurry in the same manner as in Example 1, and a coin type battery was produced in the same manner as in Example 8, where $LiMn_2O_4$ having an average particle size of 10 μm was used as a positive electrode-active material.

The lithium secondary battery so produced was subjected to a charging/discharging test by charging with a charge current of 1 mA at a charge end voltage of 4.3 V and discharging with a discharge current of 1 mA at a discharge end voltage of 2.8 V. As a result, it was found that the initial discharge capacity of the battery was 34.8 mAh and the irreversible capacity ratio was 12%. On the other hand, a discharge capacity maintenance ratio of the 100th cycle to the first cycle was found to be 96%.

EXAMPLE 12

Ge particles having an average particle size of 20 μm and graphite particles having an average particle size of 10 μm were joined together in a ratio of 70:30 by weight and subjected to a ball mill treatment for 6 hours, where the ball mill vessel and balls were made from stainless steel and the powder preparation and the ball mill treatment were carried out in an Ar atmosphere. Furthermore, the product was heated at 900° C. in an Ar atmosphere for 5 hours. Analysis of the resulting Ge—C composite powder by wide angle X-ray diffraction revealed that peaks showing diffractions of C and Ge were observed. The d (002) interplanar spacing of C was found to be 0.3355 nm and Lc was found to be 55 nm. No germanium carbide diffraction peaks were observed. The R value was found to be 0.2. As a result of observing the cross-section of the composite powder, it was found that the Ge particles were embedded in the carbonaceous material and had an average particle size of 2.3 μm. The Ge—C composite powder had a specific surface area of 49 $m^2/g$.

A battery using the Ge—C composite powder as a negative electrode-active material was produced in the same manner as in Example 8, where $LiNiO_2$ having an average particle size of 15 μm was used as a positive electrode-active material and EPDM was used as a binder to prepare a slurry together with xylylene, followed by drying based on vacuum degassing at room temperature. A solution containing 1 mole/l of lithium borofluoride $LiBF_4$ dissolved in a 1:2 (by weight) solvent mixture of EC and EMC was used as an electrolytic solution.

The lithium secondary battery so produced was subjected to a charging/discharging cycle test by charging with a charge current of 0.5 mA at a charge end voltage of 4.2 V and discharging with a discharge current of 0.5 mA at a discharge end voltage of 2.7 V. As a result, it was found that the initial discharge capacity of the battery was 10.5 mAh and the irreversible capacity ratio was 22%. A discharge capacity maintenance ratio of the 100th cycle to the 1st cycle was found to be 86%.

EXAMPLE 13

Ge particles having an average particle size of 10 μm and graphite particles having an average particle size of 10 μm were joined together in a ratio of 20:80 by weight and subjected to a ball mill treatment for 72hours, where the ball mill vessel and balls were made from stainless steel, and the powder preparation and the ball mill treatment were carried out in an Ar atmosphere. Furthermore, the product was heated at 1,000° C. in an Ar atmosphere for one hour. The resulting Ge—C composite powder, coal pitch and tetrahydrofuran were mixed together in a ratio of 100:50:500 by weight and stirred under reflux for one hour. Tetrahydrofuran was removed therefrom in a rotary evaporator, followed by vacuum drying at 150° C. for 3 hours, thereby obtaining a Ge—C composite powder/pitch composite material. The composite material was disintegrated to 200-mesh and under in a cutter mill, heated up to 250° C. in air at a rate of 3° C./min and maintained at that temperature for one hour. Then, the product was heated up to 1,200° C. in a nitrogen gas stream at a rate of 20° C./h and maintained at that temperature, thereby carbonizing the coal pitch. The carbonized product was disintegrated to 200-mesh and under in a cutter mill, thereby obtaining a Ge—C composite powder. Analysis of the resulting Ge—C composite powder by wide angle X-ray diffraction revealed that peaks showing diffractions of C and Ge were observed. The d (002) interplanar spacing of C was found to be 0.3356 nm and 0.3368 nm as two peaks. No germanium carbide diffraction peaks were observed. The average particle size of Ge particles determined by cross-sectional observation was found to be 0.8 μm and the R value was found to be 1.0. The Ge—C composite powder had a specific surface area of 14 $m^2/g$.

A battery using the Ge—C composite powder as a negative electrode-active material was produced in the same manner as in Example 1, where a solution containing 1.5 moles/l of $LiPF_6$ dissolved in a 2:3 (by weight) solvent mixture of PC and DMC was used as an electrolytic solution.

The lithium secondary battery so produced was subjected to a charging/discharging cycle test by charging with a charge current of 2 mA at a charge end voltage of 4.2 V and discharging with a discharge current of 2 mA at a discharge end voltage of 2.7 V. As a result, it was found that the initial charge capacity of the battery was 6.0 mAh and the irreversible capacity ratio was 15%. On the other hand, a discharge capacity maintenance ratio of the 100th cycle to the 1st cycle was found to be 93%.

EXAMPLE 14

Si particles having an average particle size of 10 μm and graphite particles having an average particle size of 20 μm were joined together in a ratio of 20:80 by weight and subjected to a ball mill treatment for 48hours, where the ball mill vessel and balls were made from stainless steel and the powder preparation and the ball mill treatment were carried out in an Ar atmosphere. The resulting Si—C composite powder, petroleum pitch and tetrahydrofuran were mixed together in a ratio of 100:70:700 by weight and stirred under reflux for one hour. Tetrahydrofuran was removed therefrom in a rotary evaporator, followed by vacuum drying at 150° C. for 3 hours, thereby obtaining a Si—C composite powder/pitch composite material. The composite material was disintegrated to 200-mesh and under in a cutter mill, heated up to 350° C. in air at a rate of 3° C./min and maintained at that temperature for one hour. Then, the product was heated up to 1,100° C. in a nitrogen gas stream at a rate of 20° C./h and maintained at that temperature, thereby carbonizing the petroleum pitch. The carbonized product was disintegrated to 200-mesh and under in a cutter mill, thereby obtaining a Si—C composite powder. Analysis of the resulting Si—C composite powder by wide angle X-ray diffraction revealed that peaks showing diffractions of C, Si and silicon carbide were observed. The d (002) interplanar spacing of C was found to be 0.3361 nm and 0.3378 nm as two peaks, but the d (002) interplanar spacing determined from the peak showing a maximum intensity was found to be 0.3361 nm. A diffraction peak intensity ratio of silicon carbide at the position of 2θ= about 35 deg to the background was found to be 0.1. The average particle size of Si particles determined by cross-sectional observation was found to be 2.2 μm and the R value was found to be 1.3. The Si—C composite powder had a specific surface area of 20 $m^2/g$.

A battery using the Si—C composite powder as a negative electrode-active material was produced in the same manner as in Example 1, where a solution containing 1.5 moles/l of $LiPF_6$ dissolved in a 1:2 (by weight) solvent mixture of EC and DMC was used as an electrolytic solution.

The lithium secondary battery so produced was subjected to a charging/discharging cycle test by charging with a charge current of 2 mA at a charge end voltage of 4.2 V and discharging with a discharge current of 2 mA at a discharge end voltage of 2.7 V. As a result, it was found that the initial discharge capacity of the battery was 4.1 mAh and the irreversible capacity ratio was 9%. On the other hand, a discharge capacity maintenance ratio of the 100th cycle to the 1st cycle was found to be 95%.

EXAMPLE 15

Si particles having an average particle size of 1 μm, petroleum pitch and tetrahydrofuran were mixed together in a ratio of 100:70:700 by weight and stirred under reflux for one hour. Tetrahydrofuran was removed in rotary evaporator, followed by vacuum drying at 150° C. to 3 hours, obtaining a Si/pitch composite material. The composite material was disintegrated to 200-mesh and under in a cutter mill, heated to 250° C. in air at a rate of 3° C./min and maintained at that temperature for one hour. Then, the product was heated up to 1,100° C. in a nitrogen gas stream at a rate of 20° C./h and maintained at that temperature, thereby carbonizing the pitch. The carbonized product was disintegrated to 200-mesh and under in a cutter mill, thereby obtaining a Si—C composite powder. Analysis of the resulting Si—C composite powder by wide angle X-ray diffraction revealed that peaks showing diffractions of C, Si and silicon carbide were observed, where the diffraction peak intensity of the silicon carbide was weak. The d (002) interplanar spacing of C was found to be 0.3369 nm and Lc was found to be 15 nm. A diffraction peak intensity ratio of silicon carbide at the position of 2θ= about 35 deg to the background was found to be 0.3. The R value was found to be 1.4. The Si—C composite powder had a specific surface area of 7 $m^2/g$.

A battery using the Si—C composite powder as a negative electrode-active material was produced in the same manner as in Example 1, where a solution containing 1.0 mole/l of $LiPF_6$ dissolved in a 1:2 (by weight) solvent mixture of EC and DMC was used as an electrolytic solution.

The lithium secondary battery so produced was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery was 15.3 mAh and the irreversible capacity ratio was 23%. On the other hand, a discharge capacity maintenance ratio of the 100th cycle to the 1st cycle was found to be 81%.

COMPARATIVE EXAMPLE 4

Si particles having an average particle size of 3 μm and graphite particles having an average particle size of 20 μm were joined together in a ratio of 30:70 by weight and subjected to a ball mill treatment for 72hours, where the ball mill vessel and balls were made from stainless steel, and the powder preparation and the ball mill treatment were carried out in an Ar atmosphere. The resulting Si—C composite powder, coal pitch and tetrahydrofuran were mixed together in a ratio of 100:50:500 by weight and stirred under reflux for one hour. Tetrahydrofuran was removed therefrom in a rotary evaporator, followed by vacuum drying at 150° C. for 3 hours, thereby obtaining a Si—C composite powder/pitch composite material. The composite material was disintegrated to 200-mesh and under in a cutter mill, heated up to 250° C. in air at a rate of 3° C./min and maintained at that temperature for one hour. Then, the product was heated up to 1,800° C. in a nitrogen gas stream at a rate of 20° C./h and maintained at that temperature for one hour, thereby carbonizing the pitch. The carbonized product was disintegrated to 200-mesh and under in a cutter mill, thereby obtaining a Si—C composite powder. Analysis of the resulting Si—C composite powder by wide angle X-ray diffraction revealed that peaks showing diffractions of C, Si and silicon carbide were observed, where the diffraction peak intensity of silicon carbide was weak. The d (002) interplanar spacing of C was found to be 0.3359 nm. A diffraction peak intensity of silicon carbide at the position of 2θ= about 35 deg to the background was found to be 6.0. The R value was found to be 0.6. The Si—C composite powder had a specific surface area of 36 $m^2/g$.

A battery using the Si—C composite powder as a negative electrode-active material was produced in the same manner as in Example 8, where a solution containing 1.0 mole/l of $LiPF_6$ dissolved in a 1:2 (by weight) solvent mixture of EC and DMC was used as an electrolytic solution.

The lithium secondary battery so produced was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery was 1.6 mAh and the irreversible capacity ratio was 3.8%. On the other hand, a discharge capacity maintenance ratio of the 100th cycle to the 1st cycle was found to be 98%.

COMPARATIVE EXAMPLE 5

Si particles having an average particle size of 1 μm, petroleum pitch and tetrahydrofuran were mixed together in a ratio of 100:50:500 by weight and stirred under reflux for one hour. Tetrahydrofuran was removed therefrom in a rotary evaporator, followed by vacuum drying at 150° C. for 3 hours, thereby obtaining a Si/pitch composite material. The composite material was disintegrated to 200-mesh and under in a cutter mill, heated up to 250° C. in air at a rate of 3° C./min and maintained at that temperature for one hour. Then, the product was heated up to 700° C. in a nitrogen gas stream at a rate of 20° C./h and maintained at that temperature for one hour, thereby carbonizing the pitch. The carbonized product was disintegrated to 200-mesh and under in a cutter mill, thereby obtaining a Si—C composite powder. Analysis of the resulting Si—C composite powder by wide angle X-ray diffraction revealed that peaks showing diffractions of C, Si and silicon carbide were observed, where the diffraction peak intensity of silicon carbide was weak. The d (002) interplanar spacing of C was found to be 0.359 nm. A diffraction peak intensity ratio of silicon carbide at the position of 2θ= about 35 deg to the background was found to be 0.1. The R value was found to be 1.7. The Si—C composite powder had a specific surface area of 7 $m^2/g$.

A battery using the Si—C composite powder as a negative electrode-active material was produced in the same manner as in Example 8, where a solution containing 1.0 mole/l of $LiPF_6$ dissolved in a 1:2 (by weight) solvent mixture of EC and DMC was used as an electrolytic solution.

The lithium secondary battery so produced was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery was 16.2 mAh and the irreversible capacity ratio was 25%. On the other hand, a discharge capacity maintenance ratio of the 100th cycle to the 1st cycle was found to be 2%.

A lithium secondary battery having distinguished cycle characteristics as not obtainable from by a negative electrode-active material containing single particles comprising at least one of elements capable of forming a compound with Li and a high capacity as not obtainable from a carbonaceous material can be provided in the present invention by using a negative electrode-active material containing particles comprising a carbonaceous material and at least one of elements capable of forming a compound with Li, the carbonaceous material has a d (002) interplanar spacing by X-ray diffraction of 0.3350 nm-0.3450 nm, the particles being embedded in a plurality of layers of the carbonaceous material.

What is claimed is:

1. A process for producing a lithium secondary battery, which comprises steps of:

(a) subjecting a carbonaceous material (A) and first particles including at least one of elements capable of forming a compound with lithium and having a melting point of at least 900° C. and a thermal expansion coefficient of not more than 9 ppm/K at room temperature, to mechanical pressure welding so as to embed said first particles in the carbonaceous material (A), to obtain second particles, (b) confirming that the carbonaceous material (A) is present around the first particles and that the first particles have an average particle size of 0.1 to 20 μm by observation with a scanning electron microscope (SEM) of the second particles, and that the carbonaceous material (A) has a d(002) interplanar spacing of 0.335 nm to 0.345 nm by X-ray diffraction analysis of the second particles, (c) mixing the second particles and a precursor of a carbonaceous material (B), enclosing the carbonaceous material (A) in the carbonaceous material (B), to obtain third particles, (d) carbonizing the third particles, thereby forming a negative electrode-active material, and (e) arranging a positive electrode, a negative electrode containing said negative electrode-active material and a lithium ion conductive, non-aqueous electrolytic solution or polymer electrolyte into a container.

2. A process according to claim 1, wherein at least one of the elements capable of forming a compound with lithium is at least one element selected from silicon and germanium.

3. A process according to claim 1, wherein heat treatment is carried out after the step (a).

4. A process according to claim 1, wherein the carbonaceous material (B) is harder than the carbonaceous material (A) when determined by a micro-Vicker hardness tester.

5. A process according to claim 4, wherein the carbonaceous material (A) has a smaller d(002) interplanar spacing by X-ray diffraction than that of the carbonaceous material (B).

6. A process according to claim 5, wherein the carbonaceous material (B) is amorphous.

7. A process according to claim 1, wherein the carbonaceous material (A) has a smaller d(002) interplanar spacing by X-ray diffraction than that of the carbonaceous material (B).

8. A process according to claim 1, wherein the carbonaceous material (B) is amorphous.

9. A process according to claim 1, wherein said at least one of elements capable of forming a compound with lithium is included such that an amount thereof included in said negative electrode-active material is 55% by weight or less on the basis of sum total of the negative electrode-active material.

10. A process according to claim 9, wherein said amount of said at least one of elements capable of forming a compound with lithium, included in said negative electrode-active material, is less than 30% by weight on the basis of sum total of the negative electrode-active material.

11. A process according to claim 1, wherein the carbonaceous material (A) has a crystalline carbon region.

12. A process according to claim 1, wherein the particles are of said at least one of the elements capable of forming a compound with lithium, in elemental form.

13. A process according to claim 12, wherein said negative electrode-active material includes said at least one of the elements capable of forming a compound with lithium, as particles, in elemental form.

14. A process according to claim 1, wherein said particles resulting from the step (a) have a specific surface area of not more than 100 $m^2/g$.

15. A process according to claim 1, wherein the negative electrode-active material has a specific surface area of 1 to 100 $m^2/g$.

16. A process according to claim 1, wherein the particles are of at least one element selected from silicon and germanium, in elemental form.

17. A process according to claim 16, wherein said negative electrode-active material includes said at least one element selected from silicon and germanium, as particles, in elemental form.

* * * * *